United States Patent
Verma et al.

(10) Patent No.: US 11,780,389 B2
(45) Date of Patent: Oct. 10, 2023

(54) CONTROLLER AREA NETWORK DECODER (CAN-D)

(71) Applicant: UT-Battelle, LLC, Oak Ridge, TN (US)

(72) Inventors: Kiren E. Verma, Oak Ridge, TN (US); Robert A. Bridges, Oak Ridge, TN (US); Samuel C Hollifield, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 552 days.

(21) Appl. No.: 17/117,535

(22) Filed: Dec. 10, 2020

(65) Prior Publication Data
US 2021/0178996 A1  Jun. 17, 2021

Related U.S. Application Data

(60) Provisional application No. 62/947,746, filed on Dec. 13, 2019.

(51) Int. Cl.
*B60R 16/023* (2006.01)
*G06N 20/00* (2019.01)
(Continued)

(52) U.S. Cl.
CPC ......... *B60R 16/0232* (2013.01); *G06N 20/00* (2019.01); *G07C 5/008* (2013.01); *G07C 5/0808* (2013.01); *G07C 5/10* (2013.01)

(58) Field of Classification Search
CPC .... B60R 16/0232; G06N 20/00; G07C 5/008; G07C 5/0808; G07C 5/10
See application file for complete search history.

(56) References Cited

PUBLICATIONS

Kaiser, "Automated CAN Bus Reverse Engineering," Apr. 3, 2018, https://www.linkedin.com/pulse/automated-can-bus-reverse-engineering-matthew-kaiser/ (Year: 2018).*

(Continued)

*Primary Examiner* — Aryan E Weisenfeld
(74) *Attorney, Agent, or Firm* — Warner Norcross + Judd LLP

(57) ABSTRACT

A system and method for decoding an unknown automotive controller area network ("CAN") message definitions. CAN data vehicle signal mappings are typically held in secret and varied by automotive model and year. Without knowledge of the mappings, the wealth of real-time vehicle data hidden in the automotive CAN packets is uninterpretable—impeding research, after-market tuning, efficiency and performance monitoring, fault diagnosis, and privacy-related technologies. This technology can ascertain the CAN signals' boundaries (start bit and length), endianness (byte ordering), signedness (binary-to-integer encoding) from raw CAN data. This allows conversion of CAN data to time series. Interpreting the translated CAN data's physical meaning and finding a linear mapping to standard units (e.g., knowing the signal is speed and scaling values to represent units of miles per hour) can be achieved for many signals by leveraging diagnostic standards to obtain real-time measurements of in-vehicle systems. The system and method can be integrated into lightweight hardware enabling an OBD-II plugin for real-time in-vehicle CAN decoding or run on standard computers. The system can output a standard DBC file with the signal definition information.

16 Claims, 12 Drawing Sheets

(51) Int. Cl.
   *G07C 5/10*     (2006.01)
   *G07C 5/00*     (2006.01)
   *G07C 5/08*     (2006.01)

(56) References Cited

PUBLICATIONS

Smith, Reverse Engineering the CAN Bus, 2016, further teaches reverse engineering CAN bus packets (Year: 2016).*
Gates, A.J., "CluSim: a python package for calculating clustering similarity", The Journal of Open Source Software, published Mar. 21, 2019, 4(35), 1264, pp. 1-5.
Blevins, D.H., "Time-Based CAN Intrusion Detection Benchmark", Workshop on Automotive and Autonomous Vehicle Security (AutoSec), Feb. 21, 2021, pp. 1-7.
Cho, Kyong-Tak et al., "Fingerprinting Electronic Control Units for Vehicle Intrusion Detection", Proceedings of the 25th USENIX Security Symposium, Aug. 2016, pp. 1-18.
Flach, Tobias et al., "Carma: Towards Personalized Automotive Tuning", SenSys'11, Nov. 2011, pp. 135-148.
Gmiden, Mabrouka et al., "An Intrusion Detection Method for Security In-Vehicle CAN bus", 17th International Conference on Sciences and Techniques of Automatic Control & Computer Engineering, Dec. 2016, pp. 176-180.
Li, Huaxin et al., "Poster: Intrusion Detection System for In-vehicle Networks using Sensor Correlation and Integration", CCS'17, Nov. 2017, pp. 2531-2533.
Tyree, Zachariah et al., "Exploiting the Shape of CAN Data for In-Vehicle Intrusion Detection", downloaded at arXiv:1808.10840v1, Aug. 28, 2018, pp. 106.
Narayanan, Sandeep Nair et al., "Using Data Analytics to Detect Anomalous States in Vehicles", downloaded at arXiv:1512.08048v1; Dec. 25, 2015, pp. 1-10.
Wasicek, Armin R. et al., "Context-aware Intrusion Detection in Automotive Control Systems", available at least as of Dec. 13, 2019, pp. 1-14.
Miller, Charlie Dr. et al., "Adventures in Automotive Networks and Control Units", available at least as of Dec. 13, 2019, pp. 1-101.
Checkoway, Stephen, et al., "Comprehensive Experimental Analyses of Automotive Attack Surfaces", available at least as of Dec. 13, 2019, pp. 1-16.
Choi, Wonsuk, et al., "Identifying ECUs Using Inimitable Characteristics of Signals in Controller Area Networks", downloaded at arXiv:1607.00497v1; Jul. 2, 2016, pp. 1-12.
Enev, Miro, et al., "Automobile Driver Fingerprinting", De Gruyter Open, Proceedings on Privacy Enhancing Technologies; 2016 (1):34-51.
Hanselmann, Markus, et al., "CANet: An Unsupervised Intrusion Detection System for High Dimensional CAN Bus Data", downloaded at arXiv:1906.02492v1; Jun. 6, 2019, pp. 1-9.
Huybrechts, Thomas, et al., "Automatic Reverse Engineering of CAN Bus Data Using Machine Learning Techniques", Copyright Springer International Publishing AG 2018, pp. 751-761.
Jaynes, Michael, et al., "Automating ECU Identification for Vehicle Security", 2016 15th IEEE International Conference on Machine Learning and Applications, pp. 632-635.
Koscher, Karl, et al., "Experimental Security Analysis of a Modern Automobile", 2010 IEEE Symposium on Security and Privacy, pp. 447-462.
Lee, Hyunsung, et al., "Otids: A Novel Intrusion Detection System for In-vehicle Network by using Remote Frame", 2017 15th Annual Conference on Privacy, Security and Trust, pp. 57-66.
Lestyan, Szilvia, et al., "Extracting vehicle sensor signals from CAN logs for driver re-identification", downloaded at arXiv:1902.08956v1; Feb. 24, 2019, pp. 1-11.
Lokman, Siti-Farhana, et al., Intrusion detection system for automotive Controller Area Network (CAN) bus system: a review, EURASIP Journal on Wireless Communications and Networking (2019) 2019:184, 17 pp.

Marchetti, Micro, et al., "Read: Reverse engineering of automotive data frames", 1556-6013(c) 2018 IEEE, 15 pp.
Markovitz, Moti, et al., "Vehicular Communications", Vehicular Communication 9 (2017) 43-52.
Moore, Michael R., et al., "Modeling inter-signal arrival times for accurate detection of CAN bus signal injection attacks* A data-driven approach to in-vehicle intrusion detection", Proceedings of Cyber & Information Security Research Conference, Oak Ridge, TN, USA, Apr. 4-6, 2017 (CISRC '17), 4 pp.
Narayanan, Sandeep Nair, et al., "OBD_SecureAlert: An Anomaly Detection System for Vehicles", Conference Paper May 2016, publication at https://www.researchgate.net/publication/305674115, 7 pp.
Nolan, Brent C., et al., "Unsupervised Time Series Extraction from Controller Area Network Payloads", available at least as of Dec. 13, 2019, 5 pp.
Pawelec, Krzysztof, et al., "Towards a CAN IDS Based on a neural Network Data Field Predictor*", Session: Anaomaly Detection for Controller Area Network, AutoSec '19, Mar. 27, 2019, Richardson, TX, USA, pp. 31-34.
Pese, Mert D., et al., "LibreCAN: Automated CAN Message Translator", 2019 ACM SIGSAC Conference on Computer and Communications Security (CCS '19), Nov. 11-15, 2019, London, United Kingdom. ACM, New York, NY, USA, 18 pp.
Bosch, Robert GmbH, "CAN Specification Version 2.0", 1991, 72 pp.
Provencher, Hugo, "Controller Area Networks for Vehicles", Directed Studies, ENGR 5004G, Faculty of Engineering and Applied Science, University of Ontario Institute of Technology, Apr. 2012, 67 pp.
Miller, Charlie, Dr., et al., "Remote Exploitation of an Unaltered Passenger Vehicle", Aug. 10, 2015, 91 pp.
Taylor, Adrian, et al., "Anomaly Detection in Automobile Control Network Data with Long Short-Term Memory Networks", 2016 IEEE International Conference on Data Science and Advanced Analytics, pp. 130-139.
Smith, Craig, et al., "Car Hacker's Handbook, A Guide for the Penetration Tester", No. starch press, San Francisco, Copyright 2016, 306 pp.
Tyree, Zachariah, et al., "Exploiting the Shape of CAN Data for In-Vehicle Intrusion Detection", downloaded at arXiv:1808.10840v1; Aug. 28, 2018, pp. 1-6.
Wakita, Toshihiro, et al., "Driver Identification Using Driving Behavior Signals", IEICE Trans. Inf. & Syst., vol. E89-D, No. Mar. 3, 2006, pp. 1188-1194.
Wu, Wufei, et al., "A Survey of Intrusion Detection for In-Vehicle Networks", IEE Transaction on Intelligent Transportation Systems, 1624-9050 Copyright 2019 IEEE, pp. 1-15.
Young, Clinton, et al., "Towards Reverse Engineering Controller Area Network Messages Using Machine Learning", available at least as of Dec. 13, 2019, 6 pp.
Verma, Miki E., et al., "ACTT: Automative CAN Tokenization and Translation", downloaded at arXiv:1811.07897v1; Nov. 19, 2018, 6 pp.
Website https://github.com/commaai/opendbc, available at least as of Nov. 30, 2018.
Website https://github.com/linux-can/can-utils, available at least as of Oct. 26, 2019.
Website https://en.wikipedia.org/wiki/Unified_Diagnostic_Services, available at least as of Jul. 18, 2017.
Website https://en.wikipedia.org/wiki/OBD-II_PIDs, available at least as of Aug. 27, 2019.
Website https://en.wikipedia.org/wiki/Endianness, available at least as of Dec. 11, 2019.
Website https://en.wikipedia.org/wiki/Two%27s_complement, available at least as of Dec. 10, 2019.
Website http://www.industrialberry.com/canberrydual-v2-1/, available at least as of Dec. 13, 2019.
Website https://www.sae.org/standards/content/j1939_201308/, Abstract available at least as of Jun. 12, 2018.
Website https://training.dewesoft.com/online/course/automotive-buses-can-measurement, available at least as of Dec. 13, 2019.

(56) References Cited

PUBLICATIONS

Website https://hackaday.com/2013/10/22/can-hacking-the-in-vehicle-network/, available at least as of Jul. 12, 2019.
Website http://hooovahh.blogspot.com/2017/05/can-part-5-signal-api.html, available at least as of Apr. 15, 2019.
Website https://courses.cs.washington.edu/courses/cse521/13wi/slides/06dp-sched.pdf, available at least as of Dec. 13, 2019.

* cited by examiner

Fig. 5

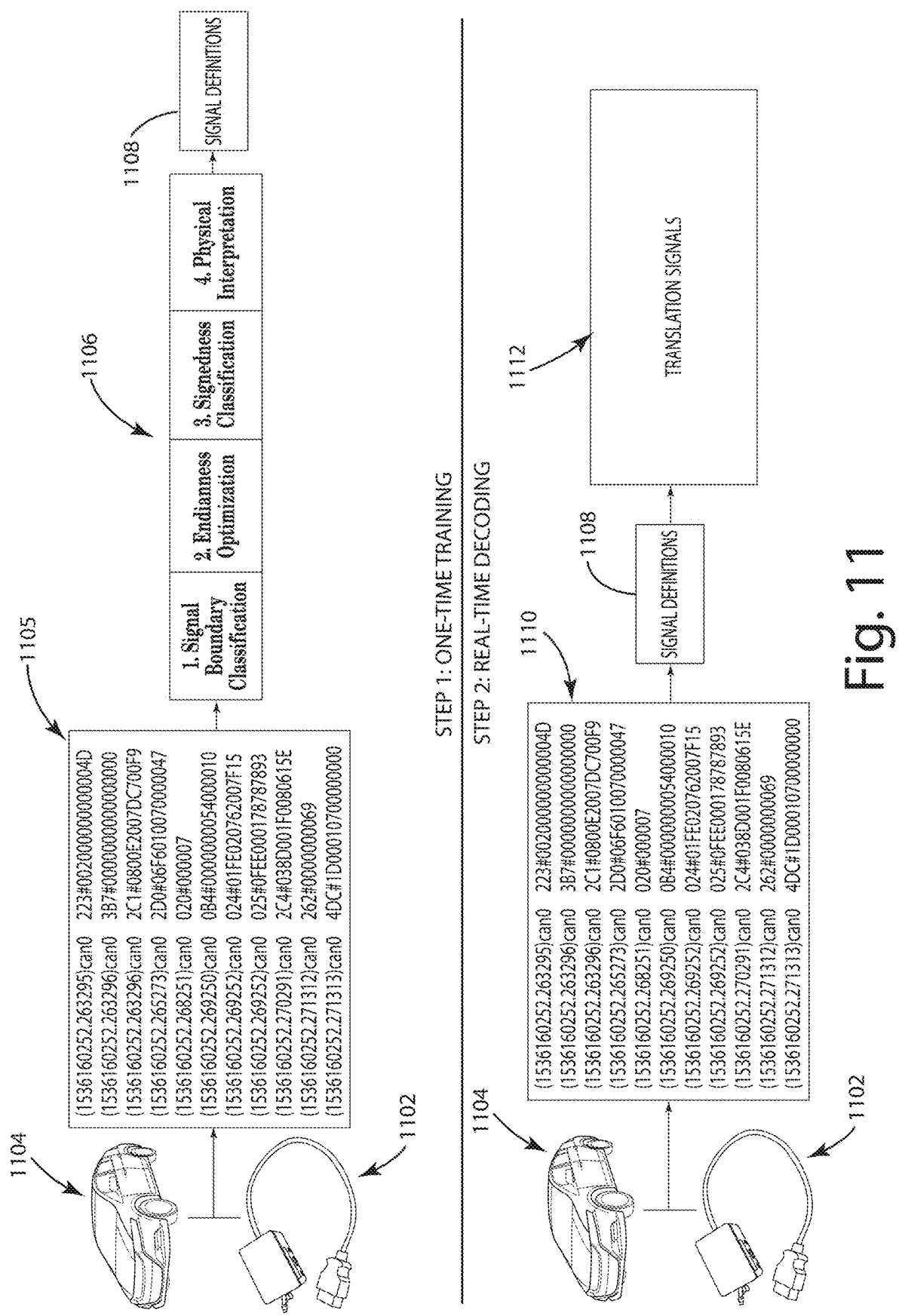

CONTROLLER AREA NETWORK DECODER (CAN-D)

RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present disclosure relates to automotive controller area networks (CANs) for real-time communication as well as decoding CAN communication without access to the CAN data mapping.

Modern automobiles rely on communication among internal computers, sometimes referred to as electronic control units, over one or more controller area networks (CANs). The communication generally adheres to a CAN communication protocol. Although the CAN protocol is generally fixed, the CAN data payload is typically encoded in a proprietary (i.e., secret) format according to a particular CAN data mapping.

Original equipment manufacturers (OEMs) of passenger vehicles generally choose and hold their mappings of CAN data to vehicle signals secret (the CAN mapping can be referred to interchangeably as CAN data signal definitions, a CAN data mapping, a CAN data encoding scheme, or some variation thereof). These mappings vary per make, model, and year. Without these mappings, the wealth of real-time vehicle information hidden in the CAN communication is uninterpretable—severely impeding vehicle-related research including at least CAN cybersecurity and privacy studies, after-market tuning, efficiency and performance monitoring, and fault diagnosis.

Each CAN frame (utilized interchangeably throughout this disclosure with CAN packet) has a structure defined by the applicable CAN protocol specification. Each CAN frame includes a CAN arbitration ID and CAN data field. The CAN data mapping provides developers with a breakdown of how and where vehicle data signals are encoded and stored in the CAN data field for each CAN frame arbitration ID. These different vehicle signals (sometimes referred to as data channels) can include signals such as engine RPM, vehicle speed, current gear, battery voltage, anti-lock brake status, GPS latitude, GPS longitude, cabin temperature, engine temperature, tire pressure, accelerator pedal angle, brake application status, fuel injection timing, radio settings, lane assist, and collision avoidance, to name a few examples, and describes how they are organized in the CAN data field.

Each CAN data field, typically up to 64-bits, may contain many different channels of varying length, with various encodings. Often the CAN mapping for each arbitration ID is stored in a CAN database in a standard .DBC file format. Without knowledge of the pertinent CAN bus specification (e.g., access to the pertinent .DBC file) it is generally difficult to discern where certain signals begin and end within the CAN data field (i.e., tokenization) let alone convert the sequence of bits to an integer (translation) and to understand the meaning of the value of each signal (i.e., interpretation).

As vehicles are increasingly reliant on electronic communication, it follows that adversarial manipulation of CAN signals have potentially severe consequences. While lightweight, the CAN protocol is bereft of basic security features, e.g., encryption and authentication. Moreover, vehicle CANs are exposed to exploitation by virtue of a mandated on-board diagnostics computer and access port. That is, in many countries, vehicles are required to comply with a diagnostic standard that requires a diagnostic on-board computer (e.g., OBD-II) and port (e.g., OBD-II port) that provides access to the CAN bus. The current paradigm for passenger vehicle CANs is "security by obscurity"—OEMs hold the CAN signal definitions secret, and vary them across years and models.

If access to the proprietary CAN mapping (e.g., via documentation or .DBC file) is unavailable, then reverse engineering the signal definitions is the only practical solution. Unfortunately, reverse engineering the CAN mapping is currently a non-automated, tedious, flawed, per-vehicle effort. CAN data is sent at a rapid rate and carries a wide variety of real-time vehicle information, an automated or semi-automated vehicle agnostic solution for decoding CAN data promises a vast resource of streaming, up-to-date information for analytics and technology development.

CAN reverse engineering is possible on a per-vehicle basis with ample effort and expertise, and generally is not a meaningful impediment to a determined adversary. The obscurity of CAN data does however hinder various forms of research and development, such as vulnerability analysis for hardening vehicle systems.

Defensive in-vehicle CAN research is a burgeoning subfield. CAN security literature is dominated by intrusion detection systems (IDS) research for in-vehicle CANs. The inability to translate CAN data has pigeon-holed CAN IDS development into a few areas. Early works implemented rules akin to signature-based detection, followed by algorithms leveraging packet header information (e.g., message frequency anomalies, as well as side-channel detection using physical or other timing based observables).

Other developments include "payload-inspection" IDSs, those that leverage the actual message carried in the CAN packet. Most of these have a naive approach, applying black-box techniques to learn patterns in the bits and identify anomalies, and generally are unable to reliably translate CAN payloads into constituent signals. However, a subset of payload inspection methods are "signal-based" in which real-time translated CAN data informs detectors. Although, these solutions are either vehicle-specific—requiring pairing with an OEM who shares the CAN mapping, manually reverse engineering signals, or use "chipping tools" to extract some CAN signals Alternative approaches have been used to acquire real-time vehicle data that attempt to circumvent the obstacle of decoding CAN data altogether, namely by using external sensors (e.g., an accelerometer), however, these approaches not only require supplementary, often expensive hardware, but exogenous data cannot be used as a proxy for translated in-vehicle data in use cases that involve reading and writing intra-vehicle messages over CAN, e.g., cybersecurity monitoring and aftermarket tuning, among other vehicle technologies.

Obtaining translated, real-time, CAN data, without access to the original CAN signal definitions used to encode that data, has the potential to accelerate vulnerability discovery and open, novel avenues for intrusion detection. Further, unveiling CAN signals provides access to real-time measurements of vehicle subsystems, from which many other research areas stand to benefit greatly, including: aftermarket tuning tools for enhanced efficiency and performance, fuel efficiency monitoring and guidance, and driver identification and privacy technologies (e.g., fleet management, vehicle fault diagnosis, forensics technologies, and insurance applications), to name a few.

The desire for access to translated vehicle CAN data has driven a new and promising sub-field. Accordingly, improvements to systems and methods for decoding vehicle CAN data are desirable.

SUMMARY OF THE INVENTION

One aspect of the disclosure relates to a vehicle-agnostic apparatus, system, and method for reverse engineering vehicle controller area network (CAN) data signal definitions. This aspect generally includes an apparatus that automatically monitors and collects vehicle CAN frames and processes CAN data ID traces (i.e., raw CAN data payloads from CAN frames with common arbitration IDs) with a CAN decoder (CAN-D) pipeline to reverse engineer signal definitions for CAN data payloads that share a common arbitration ID. CAN frames with different arbitration IDs can have different CAN data signal mappings. Each reverse engineered signal definition defines how to tokenize, translate, and in some cases interpret a CAN data payload for CAN frames having a given arbitration ID. The CAN-D pipeline can store reverse engineered CAN data signal definitions in memory (e.g., in a local CAN database file with a .DBC file extension on a CAN-D apparatus).

The CAN-D pipeline reverse engineering accounts for endianness and signedness, among other characteristics, of each CAN signal packed into a CAN data payload. Each reverse engineered signal definition defines how to both 1) tokenize the CAN data payload for a given arbitration ID by demarcating sequences of bits corresponding to different signals within the CAN data payload (e.g., identifying start bits, bit-sequence length, and byte ordering for each signal); and 2) translate the demarcated signals to convert the sequence of bits to integers, accounting for whether the signal was unsigned or signed (i.e., whether a binary-to-integer encoding was used to encode the sequence of bits).

The signal definition may also define how to interpret the translated signal. Interpretation can include labeling the translated signal to provide physical meaning or real world context to the signal. The label can include a name or ID to signify the signal's function and/or origin (e.g., combustion motor speed, combustion engine coolant temperature, engine speed) and may include the translated signal's units (e.g., rotations per minute, seconds, degrees Fahrenheit). Interpretation can also include a linear transformation to convert the translated signal's sequence of integers into an appropriate physical value (e.g., an unsigned two-byte signal has 65,535 values unique values can be mapped to the 0-10,000 range with an offset and scaling factor).

Another aspect of the disclosure relates to specific CAN-D pipeline components. The CAN-D pipeline includes modular components or sub-processes that form the overall CAN-D reverse engineering pipeline system and method. In particular, one embodiment includes signal boundary classification (i.e., determination of start bit and length for signals within the CAN data field for the CAN ID trace), endianness optimization (i.e., determination of byte ordering for each signal identified in the signal boundary classification), signedness classification (i.e., determining whether bit-to-integer encoding for each signal is base two or two's complement encoding), and physical interpretation (i.e., determination of label, units, scaling factor, and offset for each or a subset of signals). Signal boundary classification can be provided by a CAN-D unsupervised bit flip heuristic, a CAN-D supervised machine learning bit flip model, or another signal boundary classifier. Endianness optimization can be provided by a CAN-D endianness optimizer. Signedness classification can be provided by a CAN-D unsupervised signedness heuristic, a CAN-D supervised machine learning signedness model, or another signedness classifier. Physical interpretation can be provided by a signal-to-timeseries matcher.

Another aspect of the disclosure relates to real-time decoding of vehicle CAN data based on the reverse engineered vehicle CAN data signal definitions. In particular once a signal definition has been reverse engineered for a particular arbitration ID CAN frame, subsequent CAN frames with that arbitration ID can be decoded in real-time by the CAN-D system and method by tokenizing and translating the CAN frame data payload based on the signal definition associated with that arbitration ID.

Yet another aspect of the disclosure relates integration of CAN-D (i.e., the signal definition reverse engineering pipeline and real-time decoding with the reverse engineered signal definitions) into an apparatus.

CAN-D can be implemented as plug-in technology for in-situ use with nearly any vehicle. That is, CAN-D can be incorporated into an apparatus (e.g., a laptop or other edge computing device) that plugs into or otherwise communicates with a vehicle OBD-II port. The apparatus can operate in two modes: a training mode that collects CAN data then reverse engineers signal definitions and an operating mode that performs real-time decoding of CAN data based on the reverse engineered signal definitions.

One aspect of the disclosure relates to automatically determining and adapting to the CAN network bitrate. A CAN-D apparatus can be configured for communication on essentially any CAN network via for example an OBD-II port. However, many CANs operate at a different bitrate. The CAN-D device can be configured to automatically determine the network bitrate to any connected CAN and automatically communicate with that CAN network at that bitrate.

The ambient raw CAN data collected for reverse engineering the signal definitions can be augmented with responses to diagnostic queries from an on-board diagnostic service. In essence, the CAN-D apparatus can catalog responses to known diagnostic queries and because how to interpret the CAN signal responses is known, a comparison between an un-interpreted translated signal and the diagnostic responses can provide insight to interpretation.

CAN-D apparatuses, systems, and methods can learn signal definitions and decode essentially any automotive CAN signal because it is configured to account for endianness and signedness, which many known decoding methods do not. Accordingly, CAN-D can be applied to many more CAN signals than current decoding systems and methods.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 5 illustrates probabilities of CAN data signal boundaries according to big endian ordering, little endian ordering, and an exemplary tokenization.

FIG. 11 illustrates a CAN-D system for automated reverse engineering of CAN data signal definitions and real-time decoding of CAN data according to those reverse engineered signal definitions.

DESCRIPTION OF THE CURRENT EMBODIMENT

Figure 1:
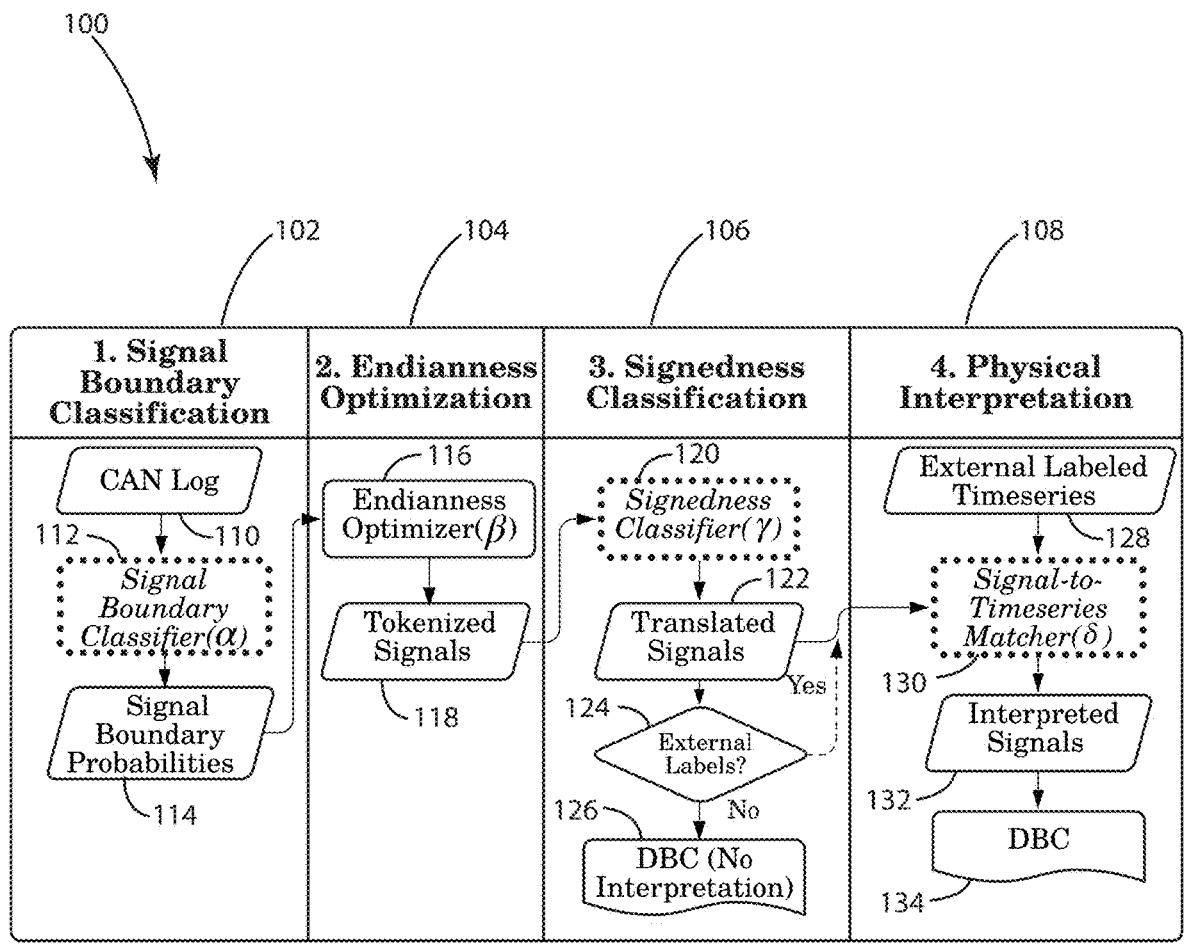
FIG. 1 illustrates one embodiment of a CAN decoder reverse engineering pipeline.

The present disclosure is generally directed to apparatuses, systems, and methods for CAN decoding and can be generally referred to as CAN-D (CAN Decoder). Current embodiments of CAN-D emphasize automatic reverse engineering of CAN mappings and use of those CAN mappings to decode CAN signals in real time. The present disclosure provides apparatuses, systems, and methods for tokenization and translation of vehicle controller area network data (CAN) that are vehicle agnostic. The systems and methods of the present disclosure include an algorithmic reverse engineering pipeline that exhibits state-of-the-art CAN signal extraction, and a lightweight hardware integration allowing OBD-II plugin for real-time CAN decoding.

One problem with CANs is that the encodings of signals into CAN packets are proprietary secrets that vary per make, model, year, even trim. Hence, without an automatic or semi-automatic decoding system and method, decoding efforts are generally per-vehicle endeavors that are manual, tedious, and inadequate for many signals, especially signals that encode latent sensor data (e.g., engine temperature or load, both of which cannot be easily observed).

Vehicles are increasingly becoming "drive-by-wire", meaning once-mechanical functions are now controlled by algorithms and computers translating inputs between user and subcomponent, yet, in general, no third party can currently make sense of the vehicle's network data without access to the underlying signal definitions used to encode the signals. Consequently, many automotive-interest areas, e.g., performance tuning, emissions research, automotive security, are severely limited because they operate blind to the meaning of the CAN data. The current approach is to reverse engineer single signals by manually manipulating inputs (e.g., turning on the lights), then looking through CAN data for changes in bits.

One aspect of the present disclosure relates to apparatuses, systems, and methods for understanding how to tokenize (i.e., cut a CAN data field into message- or signal-sized chunks), and at least partially translate (i.e., convert these subsequences of bits, which constitute a signal, into integers) these signals. In short, systems and methods of the present disclosure convert streaming bit data into a multivariate time series. Embodiments of the present disclosure can be performed on any CAN data, in particular, any vehicle's CAN data. Another aspect relates to a subset of vehicles (specifically, those admitting the Unified Diagnostic Services, generally, any modern combustion-engine vehicle in the US) and a subset of signals. This aspect relates to determining and providing to a user, an interpretation of the multivariate time-series. For example, systems and methods of the present disclosure can identify what physical measurement of the vehicle was reported (e.g., speed, accelerator pedal position, etc.) and linearly scale their values to a known unit (e.g., miles per hour, percent, etc.). In short, diagnostic signals and CAN data collected over a fixed period of ambient driving can be utilized to tokenize and translate CAN data into measurement values that describe a vehicle function in terms of a defined unit. Potentially other/external sensor data can be used in addition or replacement for the diagnostic signals to interpret translated signals.

Currently, CAN signals are reverse engineered through a painstaking manual process of initiating/observing a change in the vehicle then looking into what changed in the CAN data, and finally retesting this to gain confidence. Further, current systems and methods do not provide a framework to learn and understand certain CAN signals that cannot be physically observed or manipulated, e.g., intake temperatures.

Embodiments of the present disclosure enable reverse engineering vehicle signals from CAN data that accommodates both little and big endian byte orderings. That is, the embodiments of the present disclosure are capable of tokenizing and translating, with strong accuracy, vehicle CAN data that has been encoded with both little endian byte orderings and big endian byte orderings into a subset of individual values that represent measurements of vehicle characteristics being communicated in real-time on the CAN bus. Further, embodiments of the present disclosure enable reverse engineering vehicle signals from CAN data accommodating signedness (i.e., both "normal" base-2 bit-to-integer encoding and two's complement encoding).

Understanding the mapping for a CAN protocol instance (or portion thereof) can be an asset because technologies can be built upon the mapping. That is, if access to real-time tokenized and translated vehicle CAN data is available for at least a subset of signals, then additional features can be controlled, in real-time, based on those signals. For example, performance tuning for a variety of functions can be done by reprograming ECUs to change the data they send based on the real-time CAN messages. However, unless the ECU developer holds the CAN mapping or can reverse engineer the CAN mapping, such performance tuning is not possible. Because CAN mappings are kept proprietary in order to attempt to increase vehicle network security through obscurity, reverse engineering the CAN mappings may be the only practical way to gain access to the underlying CAN messages being communicated in the CAN data over the vehicle CAN bus.

Referring to FIG. 1, one embodiment of a flowchart 100 depicting how CAN-D operates is illustrated. The flowchart depicts how CAN-D provides a modular, four-step pipeline for identifying each CAN data signal's boundaries (e.g., start bit and length, or start and end bits) 102, endianness or byte ordering (e.g., little endian or big endian) 104, signedness or bit-to-integer encoding (e.g., normal or two's complement) 106, and augmenting extracted signals with meaningful, physical interpretation (e.g., by leveraging additional sensors or standards) to convert the signals to a labeled timeseries 108.

Put simply, one embodiment of the CAN-D pipeline is a four-step process to reverse engineer signal definitions for CAN data arbitration IDs.

The first part of the process includes learning cut or bit gap probabilities (i.e., the probability of a signal boundary occurring between two bits in the CAN data for each bit in a CAN data field associated with a particular arbitration ID). The probabilities can be determined by a processor operating on an ID trace (i.e., a sample of CAN data that shares the same arbitration ID) utilizing a signal boundary classification method. The output from the signal boundary classification method can be processed by a processor to optimize endianness by packing big endian tokens and little endian tokens (i.e., conducting a token packing optimization algorithm). The output from the endianness optimizer can be processed to determine signedness with a signedness classification method (i.e., each token can be classified as signed or unsigned). The tokens can be compared to known time-series data and labeled in response (e.g., a processor can determine if any tokens are linearly related to any diagnostic signals or other time series sensor data available to the CAN-D pipeline). The output of the CAN-D pipeline can be signal definitions for a particular arbitration ID that enable near real time decoding of CAN signals.

The CAN-D pipeline can operate on a CAN log (i.e., essentially any capture of CAN data) as an input, and output a CAN database (e.g., DBC file) that includes signal definitions. Thus, providing vehicle agnostic CAN signal reverse engineering. The italicized sub-processes in dashed lines in FIG. 1 indicate modular portions that can be fulfilled by essentially any algorithm that satisfies the inputs and outputs of that modular block. Examples and descriptions of current embodiments of these different sub-processes are provided herein. Greek letters denote examples of various tuning parameters for each of these sub-processes. In particular, alpha $\alpha$ represents one or more tuning parameters for the signal boundary classifier, beta $\beta$ represents one or more tuning parameters for the endianness optimizer, gamma $\gamma$ represents one or more tuning parameters for the signedness classifier, and delta $\delta$ represents one or more tuning parameters for the signal-to timeseries matcher sub-process.

Some preprocessing may be done in order to prepare the CAN data or ID trace for the pipeline. This can include obtaining a CAN log file 110 or other form of CAN data (e.g., obtaining can include receiving, downloading, storing in memory, opening, filtering, processing, or any other operation or set of operations to obtain the subject CAN data that shares an ID) that can be fed to the CAN-D pipeline for decoding.

Figure 5:
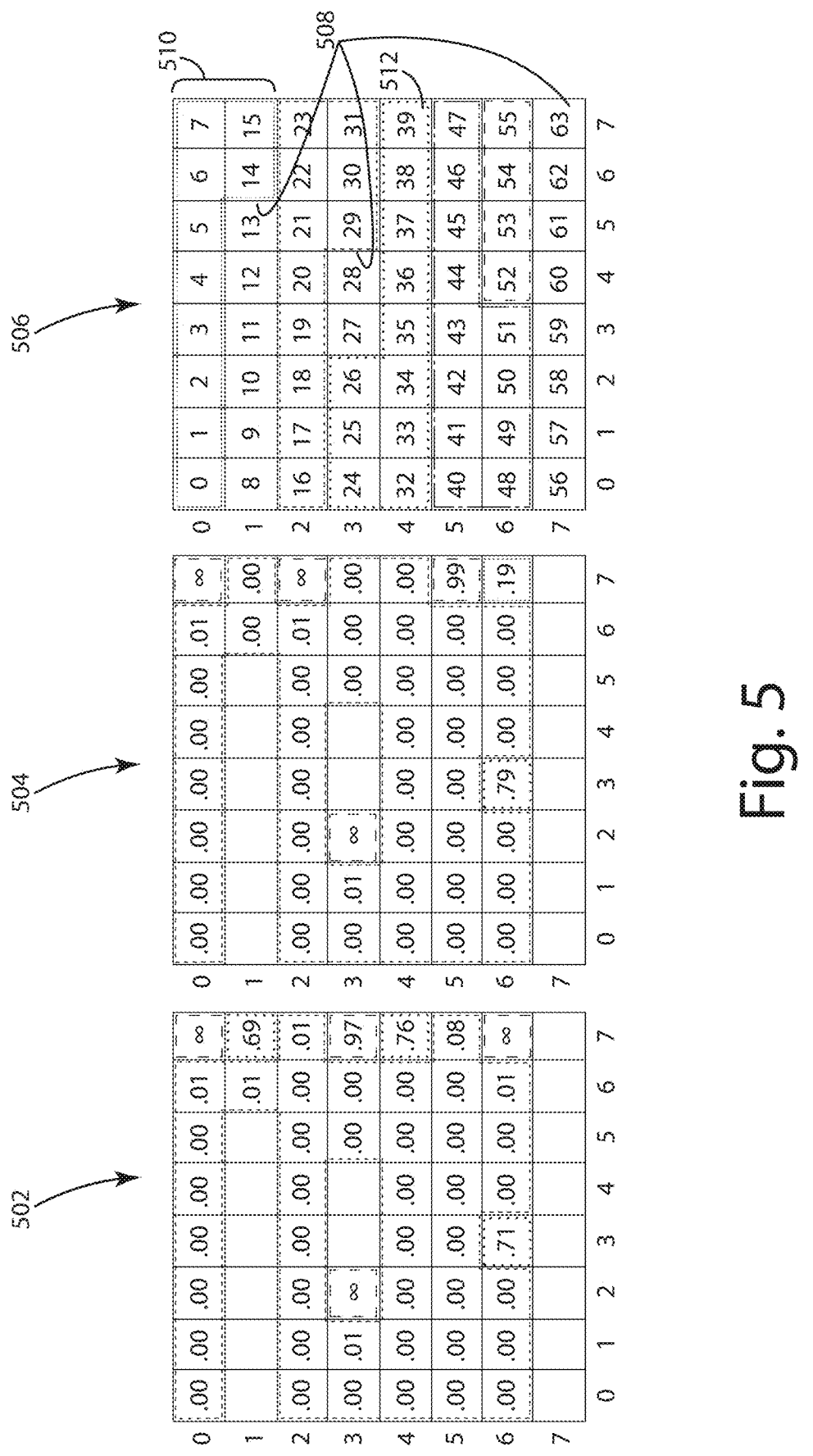

Identifying each CAN data signal's boundaries can be referred to as signal boundary classification 102 and can entail two steps: 1) applying a signal boundary classifier ($\alpha$) to a CAN ID trace 112; and 2) outputting signal boundary probabilities 114. The output may or may not include processing steps to prepare for the next step. Put simply, for each CAN data arbitration ID in a CAN log, a signal boundary classifier outputs the likelihood of a signal boundary at each bit gap (i.e., between each set of two bits). Perhaps as best shown in FIG. 5, in the current embodiment, the signal boundary classifier outputs one set of probabilities assuming a little endian byte ordering 502 and one set of probabilities assuming a big endian byte ordering 504. The signal boundary classifier can be configured to predict the likelihood of signal boundaries within CAN data as a function of bits local to a bit gap. For example, in FIG. 5, the signal boundary predictions are represented by values between zero and one (or infinity). A low value indicates a low likelihood of a bit gap (i.e., that the border between two bits represents a signal border) while a high value indicates a high likelihood of a bit gap. Infinity is used where the algorithm is certain a bit gap exists. Although FIG. 5 depicts a visual representation of the probabilities with each probability associated with a particular bit, the visual depiction is being presented to aid in explanation. In actuality, the probabilities can be conveyed or accessed within the pipeline within essentially any data structure, such as an array. Further, it is worth noting that in FIG. 5, the values represent the likelihood of a bit gap between the bit and the bit to the right of that bit (in alternative embodiments, the value could present the probability of a bit gap between the bit and the bit to the left of that bit). For example, using the bit numbers shown in chart 506, the probability of a bit gap between bit 6 and 7 in both charts 502, 504 is 0.01. While the probability of a bit gap between bit 15 and bit 0 in chart 502 (assumed big endian) is 0.69 while in chart 504 (assumed little endian) is 0.00.

The signal boundary classifier methodology can vary depending on the embodiment. Essentially any heuristic or machine learning algorithm (e.g., supervised or unsupervised) can be utilized as a signal boundary classifier. Several examples of different signal boundary classifiers are discussed herein. For example, a bit flip heuristic and a supervised machine learning bit flip model two examples of signal boundary classifiers that can be utilized in the CAN-D pipeline.

The steps associated with endianness optimization 104 can include determining tokenization (i.e., signals' positions and endianness's) based on the boundary probabilities output by the signal boundary classification. In particular, the signal boundary probabilities 114 are fed as input to an endianness optimizer ($\beta$) 116. This sub-process outputs tokenized signals 118, on which signedness classification 106 can be conducted.

The Endianness optimizer 116 can accept the signal boundary probabilities 114 and output a set of tokenized signals 118. In the current embodiment, the Endianness Optimizer 116 accepts two sets of probabilities—one set represents the likelihood of a bit gap for each bit of the CAN data assuming little endian byte ordering and another set representing the likelihood of a bit gap for each bit of the CAN data assuming big endian byte ordering. The Endianness Optimizer is configured to select one of the signal boundary probabilities and output a set of tokenized signals based on that selection. Examples of the Endianness Optimization process are discussed below.

Signedness classification 106 involves accepting the tokenized signals as input and outputting translated signals. The signedness classifier methodology can vary depending on the embodiment. Essentially any heuristic or machine learning algorithm (e.g., supervised or unsupervised) can be utilized as a signedness classifier. An example of a signedness classifier is discussed below. In the current embodiment, signedness classification is performed using a binary signedness classifier 120, which determines each tokenized signal's signedness. The signedness classifier translates the CAN data bits for each tokenized signal provided to numeric values represented by a set of translated signals 122. One example embodiment of a signedness classifier 120 is a heuristic, which is described in more detail below. Another example of a signedness classifier is a supervised machine learning algorithm.

The translated signals 122 output by the signedness classifier 120 can undergo physical interpretation 108. External labels 124 can be added to the translated signals 122 before undergoing physical interpretation 108. Further, the translated signals 122 can be output can to a DBC file 126 (or other format) without being interpretation instead of, or in addition to, being physically interpreted.

If externally labeled translated signals (e.g., diagnostic standard signals or signals from an external sensor) 124 are present, the translated CAN signals 122 can be subject to physical interpretation 108, that is, they can be input to a physical interpretation sub-process for interpretation. In particular, the physical interpretation 108 can include a supplemental signal-to-timeseries matcher 130 that compares or matches input signals to externally collected and labeled timeseries data 128. That is, the signal-to-timeseries matcher 130 compares the external labeled timeseries to the translated signals and outputs a set of interpreted signals 132. For example, this comparison can be accomplished by regression of translated signals onto concurrently collected diagnostics. The interpreted signals 132 can be stored in a DBC file 134 or otherwise communicated to a user.

Figure 2:
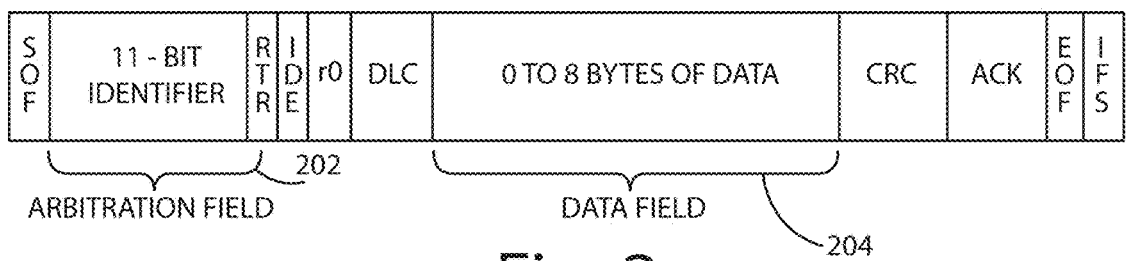
FIG. 2 illustrates an exemplary CAN 2.0 frame including an arbitration ID and data field.

Referring to FIG. 2, the CAN 2.0 frame 200 is depicted. The frame includes an Arbitration ID (AID or ID) field 202 used for indexing the frame, and a data field 204, which carries message content up to 64 bits. CAN 2.0 defines the physical and data link layers (OSI layers one and two) of a broadcast protocol. In particular, it specifies the standardized CAN frame (or packet) format represented in FIG. 2. Semantic understanding of a CAN frame can be achieved with the AID field and Data field and without knowledge of the contents of the other fields. For purposes of this disclosure, the terms "CAN frame" and "CAN packet" can be utilized interchangeably.

The Arbitration ID 202 (AID) is an 11-bit header used to identify the frame, and, at the physical layer, for arbitration (determining frame priority when multiple nodes concurrently transmit). The data field 204 contains up to 64 bits of content, and is also called the "payload" or "message".

While the format of the CAN frame is well-established by protocol, the content (including format generally, endianness, and signal boundaries) of the data field varies depending on the message and is not standardized.

Each ID's data field can be comprised of signals of varying lengths and encoding schemes packed into the 64 bits. A CAN data field may or may not utilize all 64 bits. For example, the CAN data field may include multiple signals spread out across the 64 bits with some bits being unused and remaining static. The CAN data field for some arbitration IDs is only up to 64 bits long, meaning that the CAN data field may in practice be shorter than 64 bits. As an example, one CAN data field may only by 7 bytes (i.e., 56 bits). The CAN-D algorithm can pad the CAN data with leading or trailing zeroes, or can be adapted to account for different length signals. Other information in a CAN frame or the CAN signal definition can indicate the CAN data field length. A .DBC file provides the definitions of signals in the data field for each ID, thus defining each CAN message.

CAN frames with the same ID (message header/index) are usually sent with a fixed frequency to communicate updated signal values, although some are aperiodic (e.g., triggered by an event). For example, ID 0x3A2 may occur every 0.1 s, ID 0x45D may occur every 0.25 s, etc. CAN-D partitions CAN logs into ID traces, the time series of 64-bit messages for each ID. An ID trace can be denoted by notation such as: $[B_0(t), \ldots, B_{63}(t)]_I$, a time-varying binary vector of length 64. Note that without loss of generality, each message can be assumed to be 64 bits by passing padding with 0 bits if appropriate.

Byte Order (Endianness) & Bit Order

The significance of a signal's bits within a byte (contiguous 8-bit subsequences) decreases from left to right, i.e., the first bit transmitted is the most significant bit (MSB), and the last (eighth) bit, the least significant bit (LSB). This is defined in the CAN Specification but has been misrepresented and misunderstood by previous signal reverse engineering systems and methods. The confusion results from use of both big endian and little endian byte orderings in CAN messages. Big endian (B.E.) indicates that the significance of bytes decreases from left to right, whereas little endian (L.E.) reverses the order of the bytes (but maintains the order of the bits in each byte). A notation for conveying bit orderings for a 64-bit data field under both endiannesses is shown in Equation 1, with parenthesis demarcating bytes:

$$\text{B.E.:}(B_0, \ldots, B_7), (B_8, \ldots, B_{15}), \ldots, (B_{56}, \ldots, B_{63})$$

$$\text{L.E.:}(B_{56}, \ldots, B_{63}), (B_{48}, \ldots, B_{55}), \ldots, (B_0, \ldots, B_7) \quad \text{Equation 1}$$

Examples of signals contained within the CAN data field 204 of a CAN frame are discussed below, which explain how the endianness affects signal definitions.

CAN Signals

Specifications for decoding each arbitration ID's message into a set of signal values is typically defined by an original equipment manufacturer (OEM) and held secret, usually stored in a CAN database file (.DBC or DBC file). Signal definitions typically include the properties that enable a device to automatically process the CAN data field format for each arbitration ID in order to provide 1) tokenization (i.e., demarcate sequences of bits in the data field into discrete signals); translation (i.e., convert each of those sequences of bits to integers): and 3) interpretation (i.e., scale, typically linearly, raw translated signal values to physically meaningful and human-interpretable information) a CAN data field associated with a particular AID. Some examples of the types of signal definition properties that fall within these three broad categories (tokenize, translate, and interpret) are listed below:

Tokenize
  Find start bits and lengths of signals, which gives signal positions within in the CAN data field 204;
  Find order of bits (and therefore bytes) of each signal:
    Endianness (byte order): If the signal crosses a byte boundary, little endian signals reverse the order of the bytes while big endian signals retain byte order (see Equation 1);
Translate
  Determine the signedness (bit-to-integer mapping):
    Unsigned, the usual base two encoding vs. signed, two's complement encoding;
Interpret—provides physical meaning of the signal and scale translated value to appropriate units
  Semantics
    Name/Label (e.g., speed, coolant temperature)
    Units (e.g., miles per hour, degrees Fahrenheit)
    Conversion—linear mapping of the signal's tokenized values to the appropriate value given the units
      Offset
      Scale Factor In general, it is implicit in a DBC signal definition that (non-constant) signals are contiguous sequences of non-constant bits.

Figure 3A:
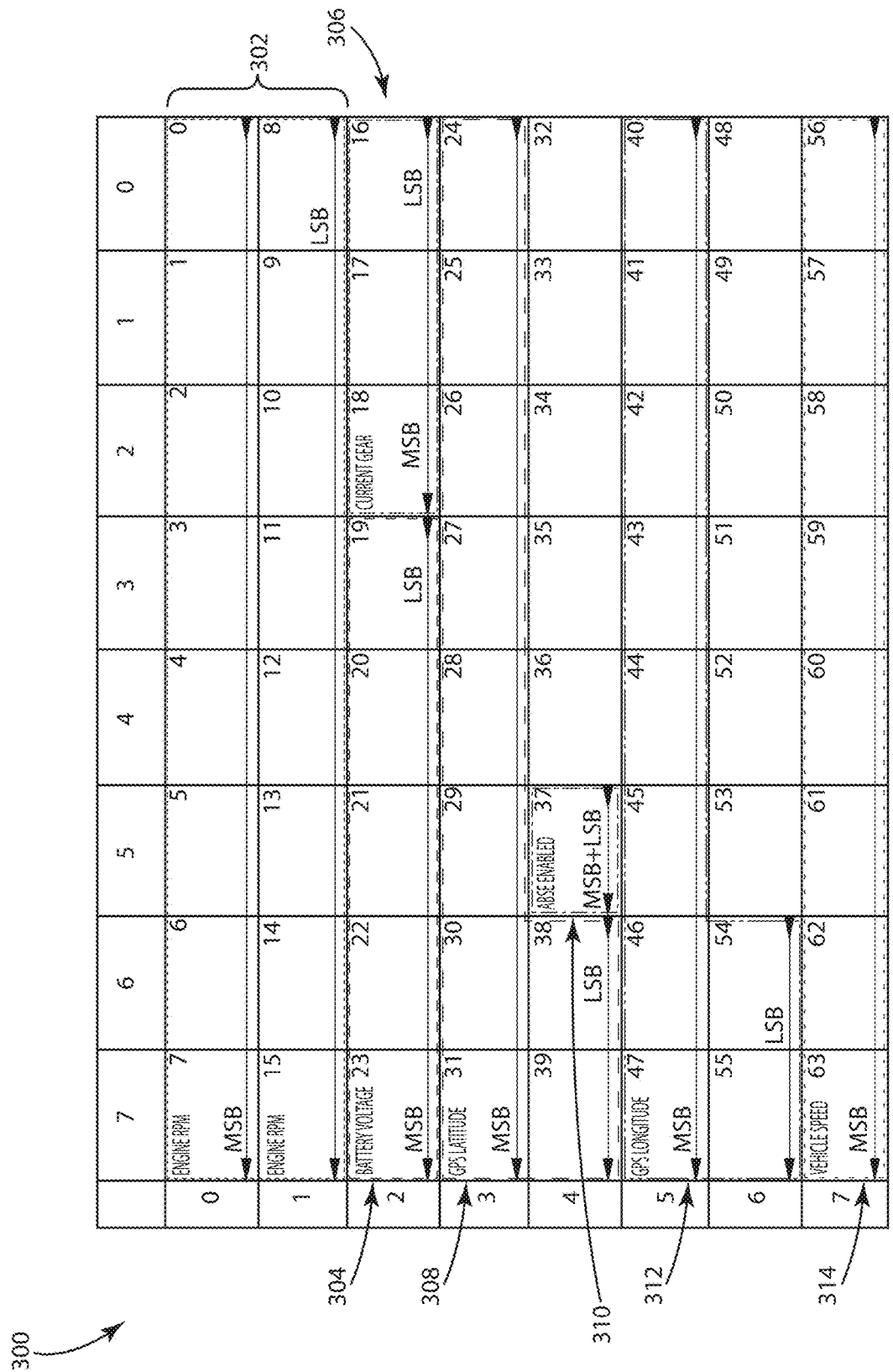
FIG. 3A illustrates a screenshot of a DBC file visualized through a DBC editor graphical user interface.
Figure 3B:
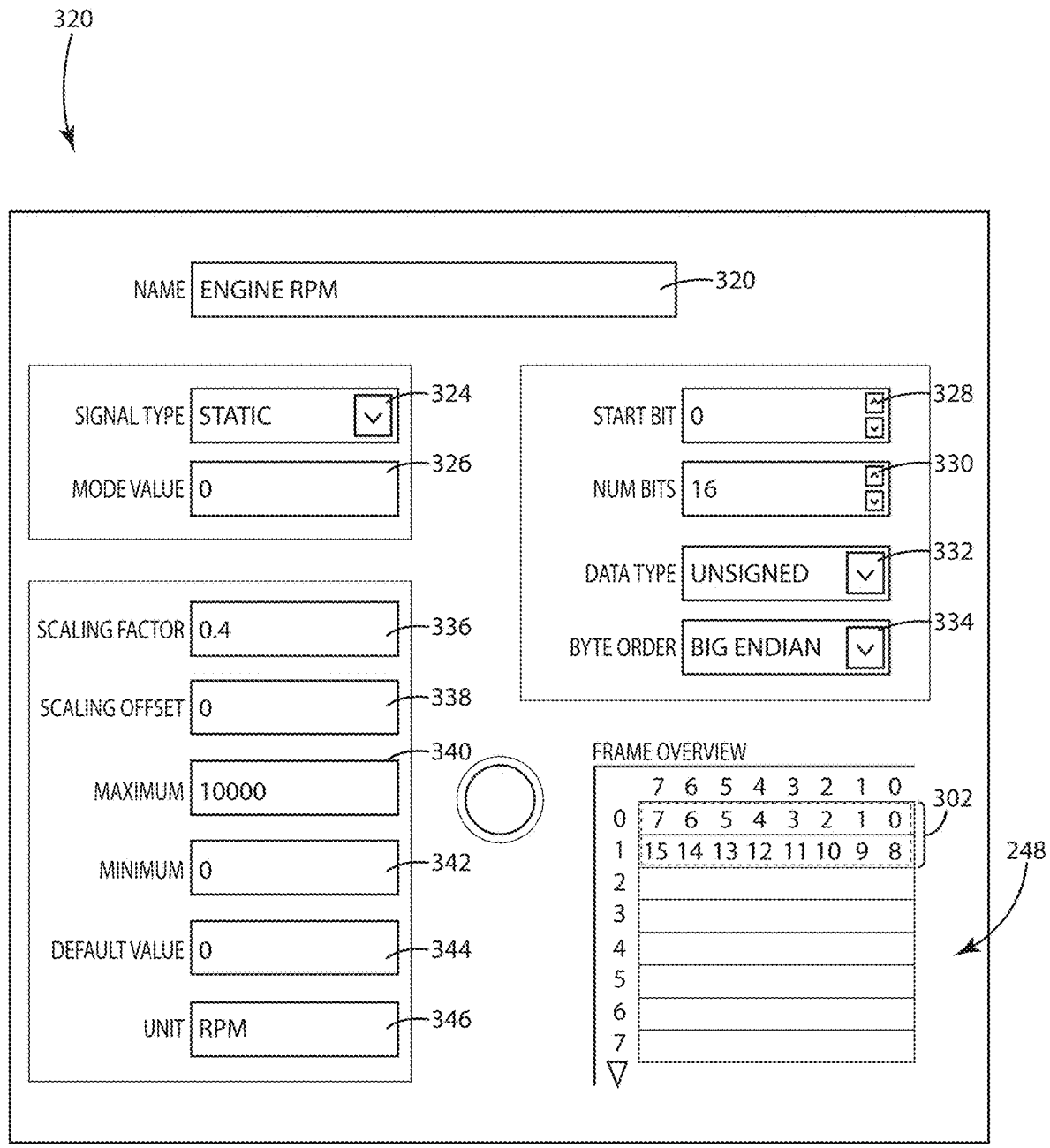
FIG. 3B illustrates a screenshot of a signal properties interface for one signal through a DBC editor graphical user interface.

An exemplary CAN data payload will now be discussed in connection with FIGS. 3A-3B to aid in understanding the various embodiments of the present disclosure. FIG. 3A illustrates a visualization 300 of a DBC file output by an exemplary DBC editor graphical user interface (e.g., CANdb++ Database Editor). The visualization 300 is provided in the form of a screenshot of a signal layout plot 300 that visually represents a CAN Message tokenization with a known or decoded mapping. In particular, seven (7) tokenized signals are depicted for one AID's 64-bit data field. The visualization is provided as an 8 by 8 array containing CAN signal(s). Individual bits are labeled with solid lines and numbered while each signal's constituent bits are grouped together with a different type or border and labeled with a separate reference numeral. This visualization and graphical user interface of FIGS. 3A-3B are merely exemplary ways in which to visualize CAN data and its characteristics. The visualization and underlying software utilized to generate, display, and manipulate the CAN data is not particular to the present disclosure—however, the visualization is helpful to aid in understanding how the various embodiments of the present disclosure operate.

Referring to FIG. 3A, the signal definitions for the EngineRPM signal 302 (bits 0-15), the BatteryVoltage signal 304 (bits 16-23), the CurrentGear signal 306 (bits 16-18), the GPSLatitude signal 308 (bits 24-31 and 38-39), the ABSEnabled signal 310 (bit 37), the GPSLongitude signal 312 (bits 40-47 and 54-55), and the VehicleSpeed signal 314 (56-63) are illustrated graphically, bit by bit with different outlines to group bits belonging to each respective signal. Unused bits are unlabeled and shown without outlines (e.g., bits 32-36 and bits 48-53). In FIG. 3A, the most significant bit (MSB) and least significant bit (LSB) for each signal are labeled.

FIG. 3B illustrates an exemplary graphical user interface that displays signal properties associated with the signal definition of the 16-bit EngineRPM signal 302 shown in FIG. 3A. In particular, the signal properties GUI 320 lists the name of the signal 322, signal type 324, and mode value 326. The signal properties GUI also lists the start bit 328 relative to that AID's CAN data field, length 330 (num bits), datatype 332 (signedness), endianness 334 (byte order or packing), scaling information (including scaling factor 336, scaling offset 338 max 340, min 342, and default 344), and unit 346. The exemplary signal properties GUI also includes a frame overview 248, which shows the position of the 16 bits of the EngineRPM signal 302 within the 8 by 8 array of the CAN data field for the subject arbitration ID. The signal properties GUI can be provided by essentially any DBC editing or viewing software, such as NI-XNET Database Editor or any other editor capable of parsing a DBC file or other CAN data file.

Tokenization and translation of the EngineRPM signal 302 will now be discussed in detail in connection with an embodiment of the present disclosure. To tokenize the signal 302 (i.e., for CAN-D to recognize or identify the appropriate sequence (implying order) of bits), the endianness of the signal is determined. For example, if bytes 1 and 2 are big endian, the bit indices are obtained using MSB-to-LSB bit indices, I=(0, . . . , 15) whereas if they are little endian, the bytes are swapped, obtaining MSB-to-LSB bit indices I= (8, . . . , 15, 0, . . . , 7), notably with bit 15 adjacent in the signal to bit 0 ($B_{15} \rightarrow B_0$). Next, the signal's signedness classification furnishes the translation of that bit sequence to an integer. Finally, the information provided by the interpretation function in this example are the label and unit of the signal (in this case EngineRPM and RPM) and the linear transformation to convert the translated values (a two-byte signal can take $2^{16}-1=65,535$ values) to the appropriate physical value (e.g., in the range 0-10,000 RPM).

Figure 6A:
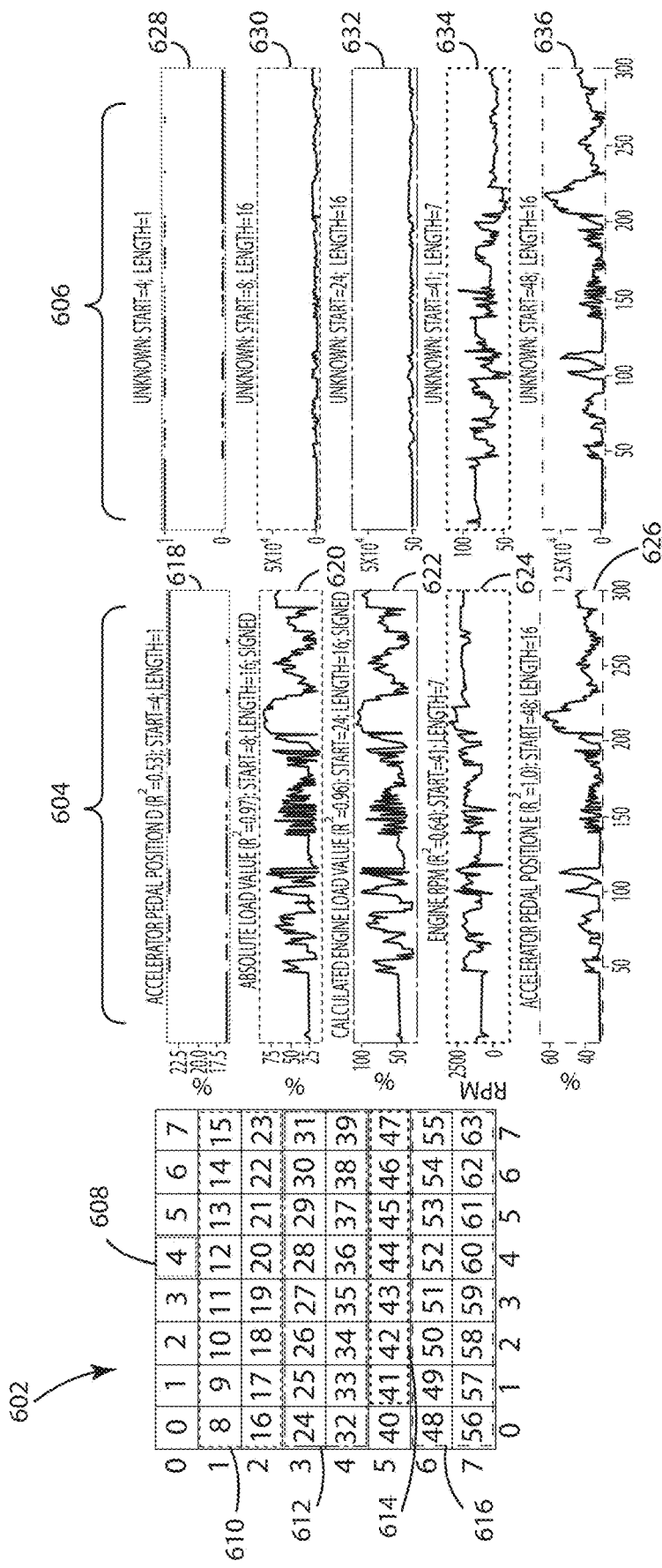
FIG. 6A illustrates a CAN data signal layout plot, CAN data timeseries signal plots correctly tokenized with CAN-D, and CAN data timeseries signal plots incorrectly tokenized with a known CAN decoding methodology.
Figure 6B:
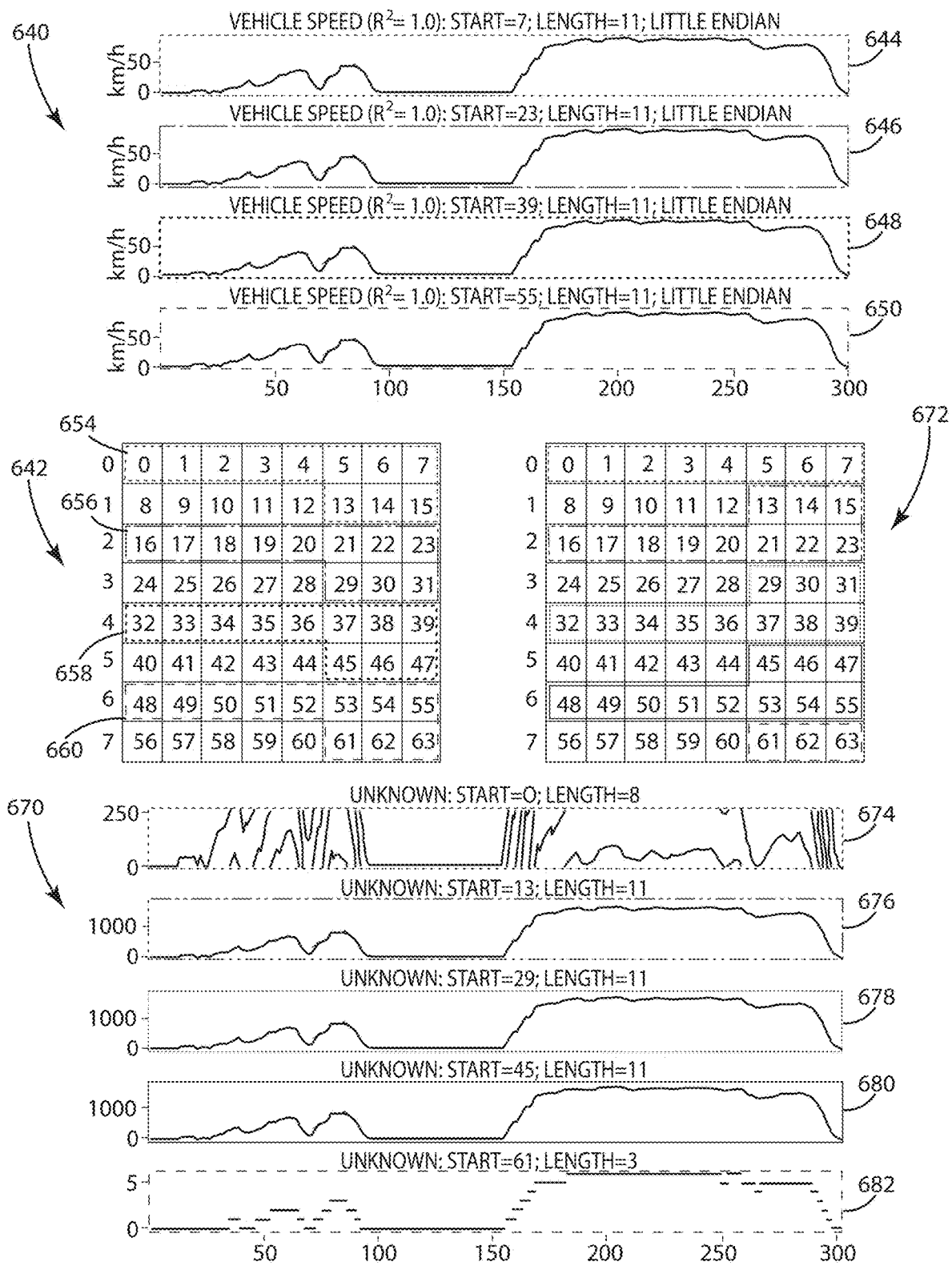
FIG. 6B illustrates CAN data signal layout plots and CAN data timeseries plots with correct tokenization & translation by CAN-D and incorrect tokenization & translation by other known methods.
Figure 6C:
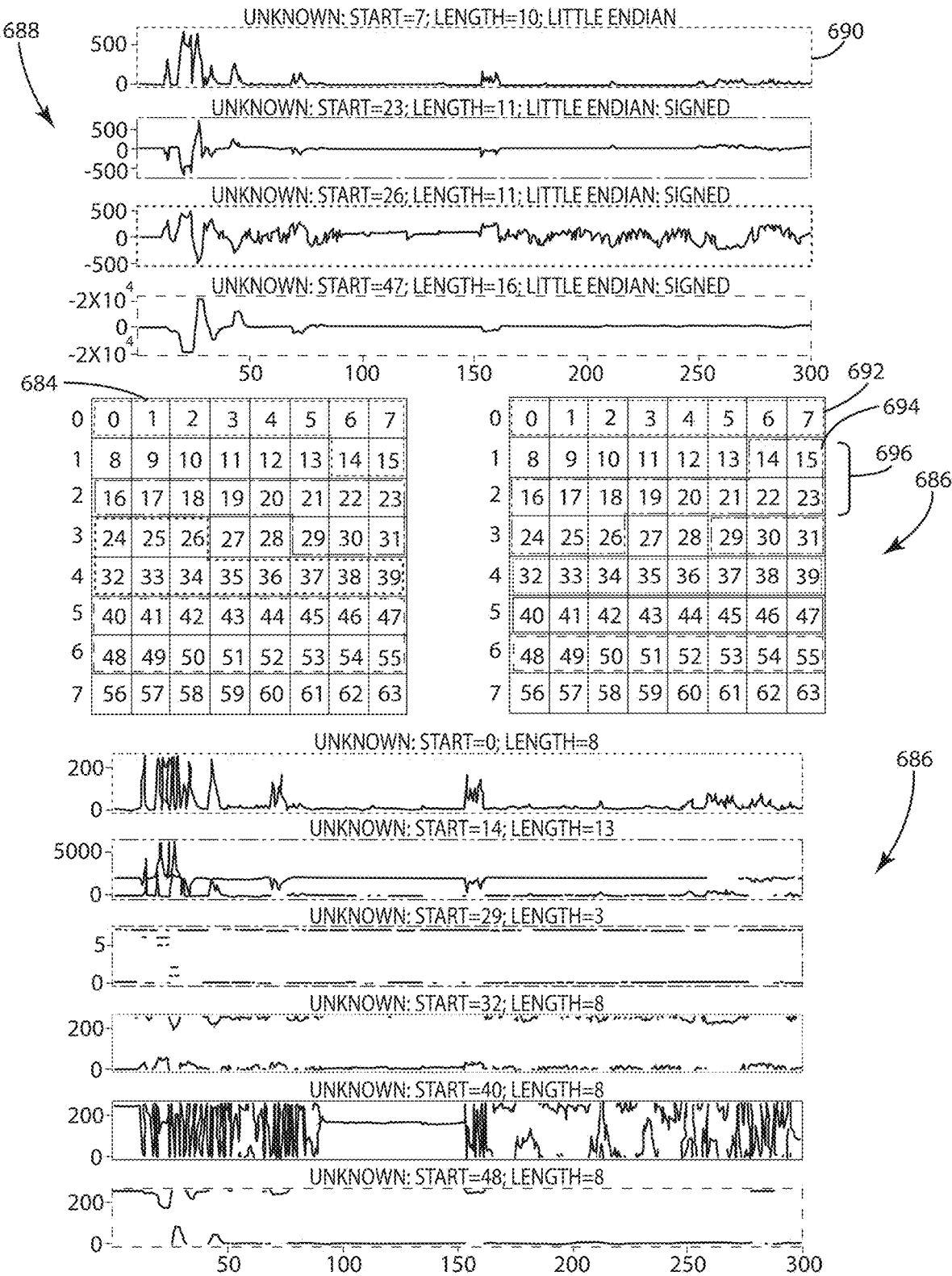
FIG. 6C illustrates CAN data signal layout plots and CAN data timeseries plots with correct tokenization & translation by CAN-D and incorrect tokenization & translation by other known methods.

FIGS. 6A-C illustrate timeseries of CAN data that have been decoded using both correct and incorrect signal definitions. In particular, FIGS. 6A-C illustrate tokenization and translation of three CAN data messages by CAN-D relative to how other known methods, such as READ and Libre-CAN, decode them. When interpretation is provided by CAN-D, the label and units of the matched diagnostic is shown with the $R^2$ value ($R^2$ is the coefficient of determination, which measures the fraction of variation of the CAN signal's variation that is explained by the matched diagnostic signal, where $R^2=1$ is best), and the CAN signals are linearly scaled accordingly.

FIG. 6A illustrates a signal layout plot for a CAN data message 602 with a particular AID, CAN data timeseries signal plots tokenized with CAN-D 604 for that AID, and the CAN data timeseries signal plots tokenized with a previous CAN decoding methodology 606. The FIG. 6A subject CAN message includes signed and unsigned engine- and pedal-related signals. The signal layout plot 602 illustrates proper signal boundaries and endianness 608, 610, 612, 614, 616, which in this example were correctly identified by CAN-D as well as a known decoding system. The CAN-D data timeseries signal plots 604 accurately translate and physically interpret all of the CAN data signals in this example with a relatively high $R^2$ score for all five signals. Good matches are found for the Calculated Engine Load Value signal 622 ($R^2=0.96$) (corresponds to bits 612), the Absolute Load Value signal 620 ($R^2=0.97$) (corresponds to bits 610), and the Accelerator Pedal Position E signal 626 ($R^2=1.0$) (corresponds to bits 616), indicated by their high goodness of fit values ($R^2$). The Accelerate Pedal Position D signal 618 (corresponds to bits 608), matches to DID 'Accelerator pedal position D' with low score ($R^2=0.53$), which means CAN-D is not as confident, but still predicts that it is likely an accelerator indicator. This information is not an available DID, accordingly CAN-D has unearthed information that could not be queried. The Engine RPM signal 624 (corresponds to bits 614 (i.e., bits 41-47)) matches to DID with ($R^2$=0.64).

In contrast, other decoding methods have difficulty translating the CAN data field bits to values, as evidenced by the timeseries signal plots 628, 630, 632, 634, and 636. For example, these plots show how other CAN decoding methodologies incorrectly translate the Calculated Engine Load Value signal 634 and the Absolute Load Value signal 632 both as unsigned, resulting in sharp discontinuities where the signals change sign.

FIG. 6B illustrates CAN data signals tokenized with correct vs. incorrect endianness. A CAN message containing four wheelspeeds encoded as little endian signals is illustrated in FIG. 6B and designated 642. As shown in the timeseries signal plots 640, the correct tokenization and translation is provided by an embodiment of CAN-D along with the matching diagnostic signal Vehicle Speed with a perfect match score ($R^2$=1). That is, the CAN message is identified as having four signals 654, 656, 658, 660 delineated on the signal layout plot 642, which correspond to the four timeseries signal plots 644, 646, 648, 650. In contrast, known methodology mis-tokenized the same CAN data field for the same AID as having five big endian signals with MSBs (bits 13-15, 29-31, and 45-47) attributed to the wrong signals, as shown in the marked CAN message 672. Despite this, all decoded speed signals 670 appear correct, save some minor discontinuities. However, these signals (674, 676, 678, 680, 682) that encode the wheel speeds are often used by Electronic Stability Control to stimulate anti-lock braking and traction control pending discrepancies in wheel speeds; hence, mixing the MSBs of wheel speeds may go unnoticed in normal conditions but prove consequential in adverse driving conditions! Put simply, because this specific case involved very closely related signals packed into a single data field, when other algorithms wrongly attributed bits to neighboring signals, these mis-tokenized signals resulted in translations that are relatively accurate much of the time, but could prove problematic for the driver's safety.

FIG. 6C illustrates layout plots and timeseries plots related to a CAN message containing four steering-related, little endian signals, three of which are signed. The CAN-D timeseries plots 684 illustrates the correct tokenization and translation by CAN-D (no interpretation), while another method's timeseries plots 686 show incorrect tokenization and translation. The incorrect plots 686 assume big endian signals and are forced to cut on most byte boundaries, resulting in mostly truncated, noisy signals 688. One particular timeseries signal plot 690 is not as noisy, but is noticeably incorrect when comparing the scale and the values for t E [0-50] to the correct CAN-D translation or ground truth. This is perhaps best seen by comparing the correct 684 and incorrect 686 layout plots, where the two MSBs 694 are misattributed to the next signal 696 instead of signal 692, resulting in errors of at least $2^8$ when the MSB(s) are nonzero.

The clear discontinuities in these mis-tokenized and mis-translated signals exhibit some of the advantages of CAN-D's endianness optimizer and signedness classifier for extracting meaningful time series.

In the U.S., all vehicles sold after 1996 include an on-board diagnostic (OBD-II) port, which generally allows for open access to automotive CANs. Emissions-producing vehicles sold after 2007 also include a mandatory, standard interrogation schema for extracting diagnostic data using the J1979 standard. This On-board Diagnostic service (OBD) is an application layer protocol that enables querying of diagnostic data from the vehicle by sending a CAN frame. A CAN response is broadcast with the requested vehicular state information. There are a standard set of queries available via this call-response protocol (e.g., accelerator pedal position, intake air temperature, vehicle speed) along with unit conversions, each corresponding to a unique diagnostic OBD-II PID (DID). It is well understood how to send and receive these call and response messages and therefore will not be discussed in detail. Previous CAN decoders have iteratively sent DID requests and parsed the responses from CAN traffic to capture real-time, labeled vehicle data without using external sensors. These time series of diagnostic responses, or DID traces can be denoted D(t). Inherent limitations exist in these queries—the set of available DIDs varies per make, and electric vehicles need not conform to this standard.

One goal of the present disclosure is to recreate a .DBC file with signal definitions for some, most, or all CAN AID's. Put another way, one aim of the present disclosure's CAN-D systems and methods is to accurately predict four properties for each CAN signal for any vehicle from a sufficient capture of a vehicle's CAN data. That is, to reverse engineer CAN signal definitions without having access to the .DBC file or other secret information that maps the CAN data field of common arbitration IDs to physical signals.

The systems and methods of the present disclosure are configured to determine which bits are constant and therefore are considered unused, account for both big and little endian byte orders, account for both endiannesses occurring in a single ID, which is permitted by protocol and DBC syntax. DBC editor GUIs allow per-signal endianness specification with a checkbox or pull down (e.g., as shown in FIG. 3B), which further reinforces that both byte orderings can co-occur in a message. The systems and methods of the present disclosure are also configured to account for the inability of a single byte to have bits used in a little endian signal while also containing bits used in a big endian signal because in such a case the byte orders indicated by the signals would be contradictory. Further, the systems and methods are configured to handle signed signals, for example using a 2's complement encoding.

In practice, it can be difficult for a CAN decoding system and method to exercise the MSBs of a signal, resulting in errors in determining signal boundaries. For example, consider the two-byte (16-bit) Engine RPM signal in the example above with translated values between 0-10,000. As 5,000 RPMs is rarely reached during practical driving, the MSB of this signal is likely to be observed as a constant 0 bit, causing the signal start bit to be mislabeled. Though this is easily surmountable for RPMs (e.g., by revving the engine in neutral during collection), this issue can be more difficult to address for latent sensors, e.g., engine temperature.

Secondly, since continuous signals are sampled periodically, those with high resolution signals (e.g., a two-byte signal has $2^{16}$>65,000 values) have LSBs flipping seemingly randomly. The TANG algorithm, one known algorithm utilized to classify signal boundaries, suffers from the overly strict assumption that flip frequencies are monotonically decreasing with bit significance.

Thirdly, considering both big and little endianness greatly enhances complexity of decoding CAN data because bits on byte boundaries have unknown neighbors (albeit in a fixed set of possibilities); e.g., simply comparing the bit flip probabilities of neighboring bits would involve custom rules for incorporating all possible neighbors according to both endianness, removing impossibilities imposed by the fact that a single byte cannot have bits used in both little and big endian byte ordering.

Fourthly, considering both signed and unsigned encodings adds another hurdle; in particular, the order of bit representations mod $2^i$ is the same for both signed and unsigned, half the bit strings represent different integers.

Finally, many CAN signals communicate sensor values that are hard to measure with external sensors; hence, identifying the physical meaning, unit and linear mapping (scale and offset) can be difficult.

Below, the disclosure covers six CAN-D aspects for automotive CAN signal reverse engineering. Embodiments of the present disclosure can incorporate any number of these different aspects in essentially any combination.

Comprehensive Signal Reverse Engineering Pipeline

One aspect of CAN-D is that it provides a modular, four-part pipeline. A flowchart 100 representing the modular pipeline is depicted in FIG. 1. The pipeline illustrates how CAN-D is configured to learn four components of CAN signal definition, respectively. The pipeline is modular in that: Step 1 102 can accommodate any signal boundary classification method; Step 3 106 can accommodate any signedness classification algorithm; and Step 4 108 can accommodate any signal-to-time series matching algorithm for physical interpretation. Instantiating the pipeline with a signal-boundary classification heuristic and (separately) a trained machine learning classifier for Step 1 and known diagnostic sensor matching (e.g., that of Verma, M. E. et al. (2018) ACTT: Automotive CAN Tokenization & Translation. CSCI IEEE, which is hereby incorporated by reference in its entirety) for Step 4. Overall, CAN-D accommodates signals as defined in automotive DBC files, and can accurately predict CAN data signals. Further, it provides a framework for improving different aspects of CAN decoding.

Signal Boundary Classification Algorithms

Two exemplary state-of-the-art signal boundary classification algorithms are described herein: a signal boundary classifier based on a supervised machine learning model and a signal boundary classifier based on a heuristic. Essentially any signal boundary classification algorithm can be utilized. For example, a heuristic signal boundary classification algorithm can be implemented in the CAN-D pipeline or a supervised or unsupervised machine learning signal boundary classification algorithm can be implemented in the CAN-D pipeline. Such classifiers can provide increased accuracy of signal boundary classification relative to previous known methods, superior in both recall and precision.

Endianness Optimization Formulation and Solution

Known CAN decoders are based on an assumption of big endian byte ordering (to perform tokenization and/or signal-to-timeseries matching) and there is no known, simple remediation for adapting the previous algorithms to perform correctly in the presence of both big and little (reverse byte order) endian signals. The second step of the CAN-D pipeline includes a sub-process configured to use the predictions from any signal-boundary classification algorithm from Step 1 as input to determine an optimal set of endiannesses and signal boundaries from all possible or practical tokenizations. CAN-D includes an objective function that can reduce the search space to a tractable grid search algorithm for optimization. Overall, this allows all signal-boundary classification algorithms to be leveraged for extracting both little and big endian signals—which has thus far been ignored and/or insurmountable in known CAN decoding systems.

Signedness Classification

CAN-D provides a sub-process for determining signal signedness (bit-to-integer encoding), allowing translation of signals to time series. Testing shows this heuristic can achieve greater than 97% F-Score. Essentially any signedness classification algorithm can be utilized. For example, a signedness heuristic can be implemented in the CAN-D pipeline or a supervised or unsupervised signedness machine learning algorithm can be implemented in the CAN-D pipeline.

OBD-II Plugin for In-Situ or Offline Use

CAN-D can be run offline for post-drive analysis or during operation/driving e.g., to feed online analytics such as a CAN intrusion detection system (IDS) with translated CAN data. A lightweight on-board diagnostic (OBD-II) port plugin device can provide CAN-D in any vehicle where a CAN is accessible via the OBD-II port (most vehicles). In a signal learning phase, the device can automatically log CAN data while periodically querying supported DIDs. In the learning mode, CAN-D can operate the algorithmic pipeline to learn signal definitions and write a DBC or partial DBC. This allows real-time decoding of CAN signals on future drives, e.g., to feed a novel analytic technology leveraging the vehicle's signals online, or offline uses, e.g., to analyze CAN captures in post-collection analysis. This device can bridge the gap between algorithmic research and actual practical online use with any vehicle.

Unveiling CAN signals can provide real-time measurements of vehicle subsystems, a rich stream of data that can fuel many vehicle technologies and put development and analytics in the hands of the consumers (in addition to OEMs).

A vehicle-agnostic CAN signal reverse engineering tool, such as CAN-D, promises to remove hurdles imposed by obscured CAN data and provide rich, online, time-series data for advancements in detection and other security technologies. Further, this CAN signal decoding can promote universally applicable technologies to address vehicles currently on the road and remove reliance on the vehicle OEMs for CAN security.

CAN-D can provide access to the decoded CAN data in order to allow further development of driver fingerprinting, where drivers are identified based on their driving characteristics, such as braking, accelerating, and steering. CAN-D can allow applications in this subfield to be ported to plugin technologies for nearly any vehicle, impacting at a minimum driver privacy and insurance strategies, and potentially forensic (e.g., criminal) investigations, and vehicle security to name a few areas.

In addition, access to CAN signals can potentially assist development of after-market tuning tools for enhanced efficiency and performance, fuel efficiency monitoring and guidance, fleet management, vehicle fault diagnosis, cyber security technologies forensics technologies, and after-market vehicle-to-vehicle capabilities.

Further, as after-market technologies to provide autonomous driving capabilities to current vehicles appear in particular, applications such as Open Pilot (https://comma.ai/), the ability to provide latitudinal and longitudinal control for many vehicles on the road can be provided using a few manually reverse engineered CAN signals. Automated, accurate, and universally applicable CAN de-obfuscation promotes and expedite such vehicle technologies, especially, after-market solutions for many vehicles currently in use CAN-D can avoids pitfalls of previous CAN decoders by not assuming big endian byte order and unsigned encodings.

To identify signedness, a binary classifier can be utilized. Accounting for different endianness can be difficult because (1) signal boundary algorithms generally depend on flip counts of "neighboring" bits, but bit orderings change with endianness, so neighboring bits cannot be determined; and (2) without considering both endiannesses, the locality of predictions makes signal boundary identification computationally simple (the same binary classification is independently repeated 64 times per ID), but considering all byte orderings grows the search space combinatorially ($2^{64}$ boundary options $2^8$ byte orders >4.72E21 tokenizations per ID!) with a web of changing dependencies.

CAN-D Algorithm

The CAN-D (CAN-Decoder) algorithm will now be described in further detail. As discussed in connection with FIG. 1, CAN-D is generally directed to a four-step modular pipeline that provides a vehicle-agnostic CAN signal reverse engineering solution. Examples of the inputs and outputs for the modular components, along with a description of the sub-processes that makeup the CAN-D algorithm are described herein. In particular the sub-processes include—a signal boundary classifier (Step 1), a signedness classifier (Step 3) and a signal-to-timeseries matcher (Step 4)—as well as an endianness optimizer (Step 2), which provides the glue for the other interchangeable components.

Step 1: Signal Boundary Classification

In the current embodiment, given an ID trace as input, a signal boundary classifier can make up to 64 binary classification decisions—for each of the 64 bits (if the CAN signal is shorter, it can be padded with zeroes or the algorithm can be adapted to accommodate variable size inputs). The current embodiment of the classifier predicts if each bit is the least significant bit (LSB) of a signal (or not), effectively deciding if a signal boundary or "cut" occurs between each bit and one of its neighbors. In general, signal boundary classifiers have typically focused on use of hand-crafted heuristics that leverage only one feature, the probability of each bit flipping. One aspect of the present disclosure pursues that goal, but utilizes a wider set of features. While one embodiment of the signal boundary classifier employs a heuristic, other embodiments employ a machine learning algorithm to determine signal boundaries. For example, the present disclosure can leverage a machine learning (ML) algorithm (supervised or unsupervised) to provide a signal boundary classifier. In the current disclosure several types of signal boundary classifiers are described including a signal boundary heuristic and a supervised machine learning algorithm, but other types of signal boundary classifiers can be implemented in the modular CAN-D pipeline that replace or augment these types of signal boundary classifiers.

For the CAN-D reverse engineering pipeline, outputs of the signal boundary classifier in Step 1 are provided as inputs to an endianness optimizer in Step 2. While signal boundary identification can be framed as a set of binary classifications, the input for Step 2 of the CAN-D pipeline is the estimated probability—in $\{0, 1\}$ for binary heuristics or in $[0, 1]$ for ML—of a signal boundary for each bit. Other signal boundary classification algorithms could be used as the signal boundary classifier for this step, which generally produce binary label outputs.

For example, one such exemplary signal boundary classification algorithm is the Transition Aggregated N-Grams (TANG) signal boundary classification algorithm. TANG uses a computationally efficient way to obtain the bit flip count; hence, if an n-bit signal's subsequent values change by unit increments, the LSB will exhibit $T_i = 2^n + 1$, and each next significant bit will have TANG values decreasing by a factor of 2. This can be utilized to calculate signal boundaries by computing the TANG vector from an ID trace, identifying the bit with maximal TANG value as a signal's LSB, and walk left absorbing bits into the signal until the TANG value increases. The next stage in the CAN-D pipeline can take the signal boundaries determined by TANG as an input and use other CAN-D modules to determine endianness, signedness, and interpret some signals. Specifically, CAN-D can account for byte (as opposed to bit order considered by some) order, without assuming big endian, unsigned, and continuous signals like other decoding methods.

As further examples, heuristics and unsupervised and supervised machine learning predictions can be utilized for signal boundary classification. They can be based on statistics describing how a particular bit and its neighboring bits flip. A ground truth DBC can be utilized to create a target vector, providing a 0/1 label for each bit indicating if it is a signal's LSB (boundary). In order to deal with the issue that neighboring bits at byte boundaries that are conditioned on endianness, little endian signals are split on byte boundaries for training (the supervised models) and testing (all) models. In use, the classifier (heuristic or ML) can be applied to ID traces under both byte orderings (see Eq. 1), creating two sets of predictions. One set of prediction assumes big endian byte order and one set of prediction assumes little endian byte ordering. Both sets of predictions can be input to Step 2, which can determine endianness by determining which predictions are accurate and represent the signal boundary and endianness of the various signals.

This disclosure describes two views of data used for training then scoring/tuning the ML. Both can also be used for testing all methods. For training, constant bits can be removed (obvious boundaries) forming a "condensed trace". The motivation for this is at least threefold:

(1) Observed constant bits delimit signals, so a simple rule suffices to identify obvious signal boundaries;
(2) CAN-D features encode neighboring bits' values and flips, so when nearby bits are constant, features are either trivial or undefined. Removing the constant bits prior to feature building yields a better feature set; and
(3) Classes are biased towards the negative class—that is most bits are not a LSB and not on a signal boundary. By removing constant bits, better features are developed, the number of non-obvious signal boundaries increases, and class bias is reduced, in particular for the nonobvious examples, which is precisely the instances for which a classifier is needed.

Using this condensed trace, a feature array with shape m non-constant bits by $n_f$ features (features described below for each method) can be built.

For tuning the ML classifiers related to this, performance of just the non-obvious boundaries in the original data can be considered—those boundaries not abutting constant bits in the non-condensed ID traces. The supervised model can be tuned based on this set of features because ultimately the model can be applied to the full 64-bit traces and this can help to optimize performance for this situation.

Supervised Classification

To describe features conceptually, $i \pm 1$ is utilized to denote bit i's neighbors, notationally neglecting the varying neighbors based on endianness (ref. Eq. 1) when it only presents unnecessary complications. For each bit i, a set of (e.g., 15) features can be generated:

five local features to bit i and its relationship to bit i+1, which can be denoted by $v_i^{id} \in \mathbb{R}^5$. These features represent estimated probabilities of a "bit flip" based on observations in data over time. The flip of a bit i—alternating value in subsequent messages, $B_i(t_j) \neq B_i(t_{j+1})$—can be denoted $F_i$.

Table I shows local bit-flip features: $F_i$ denotes a flip of bit i.

TABLE I $P(F_i)$
$P(F_i | F_{i+1})$
$P(F_{i+1} | F_i)$
$P(\neg F_i | \neg F_{i+1})$
$P(\neg F_{i+1} | \neg F_i)$ Due to the nature of vehicle CAN data signals, a signal's LSB generally alternates its value much more often than an adjacent signal's MSB; hence, the bit-flip features provide good indicators for boundaries. Specifically, the first feature should identify LSBs ($P(F_i) \approx 1$) and MSBs ($P(F_i) \approx 0$). The next four conditional bit flip features are expected to differ significantly for adjacent bits contained in the same signal versus those that are part of separate signals, as the former are likely dependent while the latter are likely independent.

The algorithm analyzes the neighboring bit on the right, bit i+1, and adds the five local features for this bit $v_{i+1}^{id}$ to a feature set for bit i. In addition, the algorithm includes adding five difference features $\delta(v_{i+1}^d, v_i^{id})$, yielding a total 15-length feature vector for bit i.

A wider variety of features based on bit values, two-bit distributions, and entropy, as well as more left/right neighboring features can be added to the feature vector in alternative embodiments. However, in the current embodiment, this feature vector makeup provides reasonable classification performance while avoiding overfitting.

A variety of different binary classifiers can be utilized: Naive Bayes, Logistic Regression, Support Vector Classifiers, Decision Trees, Random Forests, K-Nearest Neighbors, Multi-Layer Perceptrons, and AdaBoost to name a few examples. Different weighting schemes can be utilized to combat the bias class issue as well as the fact that the algorithm only scores the non-obvious boundaries. In some embodiments, a sample weighting scheme of nonobvious-positive:negative:obvious-positive labels of 8:4:1 provides satisfactory results. The accuracy of the classifier can be verified with Leave-One-Out-Cross-Validation (LOOCV), holding out one CAN log per fold and aggregating the results, only scoring nonobvious boundaries.

Classification metrics can be aggregated using LOOCV by CAN log, only scoring non-obvious boundary decisions. Optimal parameters can be chosen using a grid search and LOOCV in order to provide a tuned model. For example, a tuned random forest classifier is utilized in some embodiments as the step 1 binary classifier and provides about an 88% precision and 95% recall for an F-Score of 91%. Table II below lists aggregated Classification Metrics using LOOCV by CAN log, only scoring non-obvious boundary decisions. Metrics are shown for classifiers with default Scikit-learn parameters as well as the top-performing Random Forest Model with optimal parameters chosen using a grid search.

TABLE II

| Classifier | F-Score | Precision | Recall |
| --- | --- | --- | --- |
| Naive Bayes | 71.6 | 57.6 | 94.7 |
| Logistic Regression | 86.9 | 82.1 | 92.3 |
| SVC Linear | 85.5 | 78.6 | 93.8 |
| SVC Poly | 88.7 | 85.3 | 92.3 |
| SVC RBF | 89.0 | 84.8 | 93.8 |
| SVC Sigmoid | 46.4 | 42.3 | 51.4 |
| KNN | 88.1 | 81.3 | 96.2 |
| MLP | 88.4 | 82.5 | 95.2 |
| AdaBoost | 87.6 | 82.6 | 93.3 |
| Decision Tree | 78.5 | 67.8 | 93.3 |
| Random Forest | 90.2 | 85.4 | 95.7 |
| Random Forest (Tuned)[1] | 91.2 | 87.6 | 95.2 |

[1] max_features = $\sqrt{n_f}$, min_samples_Leaf = 3, n_estimators = 200, max_depth = 5

The output of the classifier can be provided to Step 2 (discussed below). Alternatively, the output provided can be the classifier's predicted probability of a bit i being a signal's LSB. As discussed above, the output can be provided in the form of two sets of bit predictions (one for little endian and one for big endian), e.g., two separate bit arrays of predictions of bit gaps (i.e., the position between two bits where a signal begins or ends) in the CAN data. Before discussing Step 2 in further detail, another signal classification subprocess is discussed, a CAN-D signal boundary classification heuristic.

Signal Boundary Classification Heuristic

Another exemplary signal boundary classification algorithm that can be utilized in CAN-D is a heuristic, e.g., that utilizes bit-flip probabilities. In particular, the conditional bit-flip probability $P(F_{i+1}|F_i)$ and the difference between successive conditional bit flip probabilities $P(F_{i+2}|F_{i+1}) - P(F_{i+1}|F_i)$ can provide a practical indicator of whether a signal ends at bit i. This heuristic, based on both of these features, is generally more accurate than those based on the difference of unconditional bit flip probabilities $P(F_{i+1}) - P(F_i)$ used by other CAN decoding systems.

Figure 4:
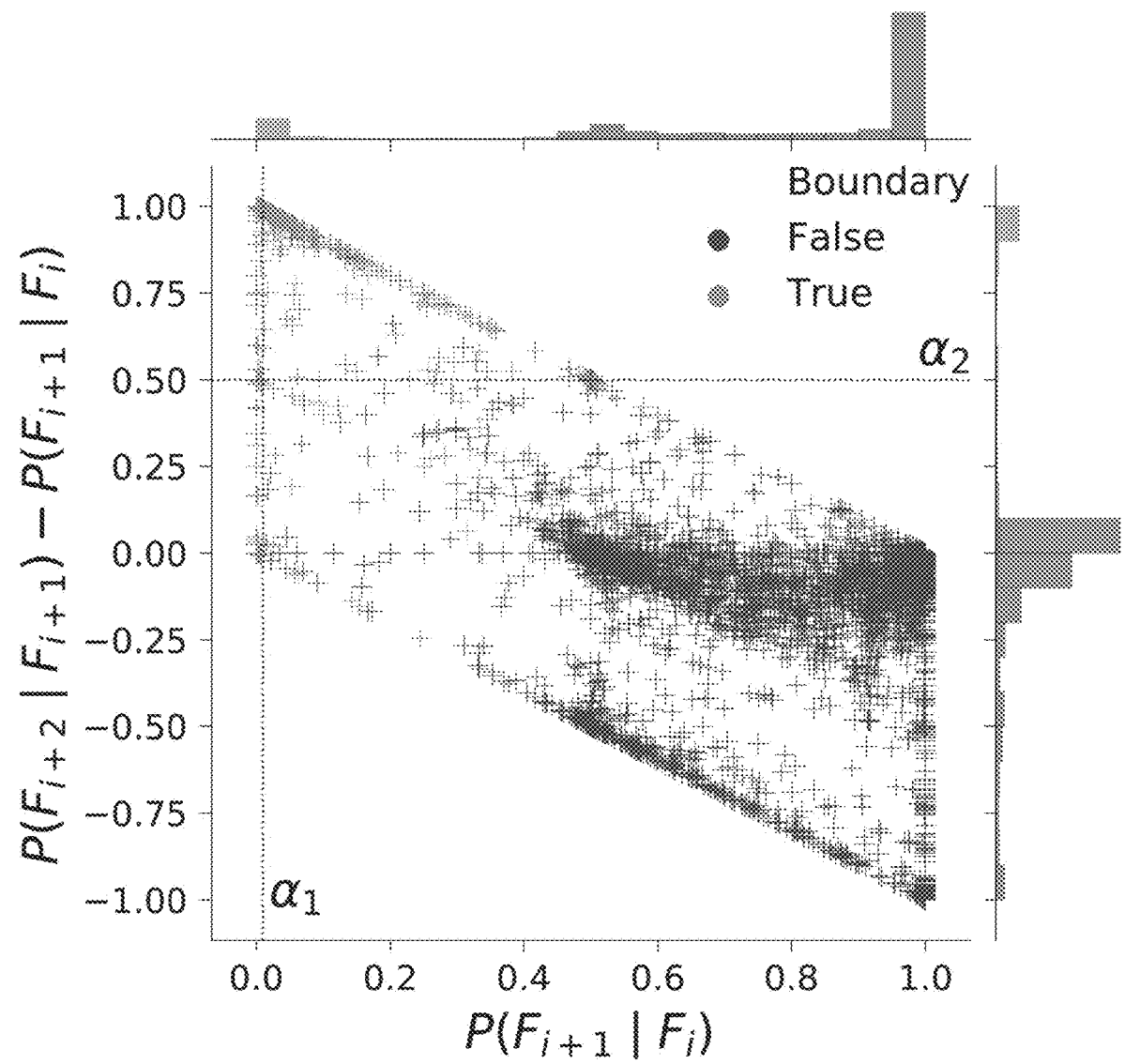
FIG. 4 illustrates a visualization of a heuristic CAN data signal boundary classifier based on conditional bit flip probabilities.

An illustration of one embodiment of a signal boundary classifier in the form of a heuristic is shown in FIG. 4 and the algorithm for the heuristic signal boundary classifier is defined in Algorithm 1 below. The graph in FIG. 4 shows the difference between successive conditional bit flip probabilities $P(F_{i+2}|F_{i+1}) - P(F_{i+1}|F_i)$ on the Y axis and the conditional bit-flip probability $P(F_{i+1}|F_i)$ on the X axis.

Algorithm 1: Heuristic Signal Boundary Classifier

Inputs: $P(f_{i+1} | F_i)$, $P(F_{i+2} | F_{i+1})$, $\alpha_1$, $\alpha_2$
if $P(F_{i+1} | F_i) < \alpha_1$ or $P(F_{i+2} | F_{i+1}) - P(F_{i+1} | F_i) > a_2$
    then
    |   return TRUE
else
    |   return FALSE In the current embodiment, the heuristic parameters $\alpha_1$, $\alpha_2$ are set to split the feature space. In particular, in the current embodiment depicted in FIG. 4, the heuristic parameters are set as $\alpha_1 = 0.01$, $\alpha_2 = 0.5$ and yield a 90% F-Score and Precision and 89% Recall (also scoring only nonobvious boundaries). These heuristic parameters can be used generally for CAN-D signal boundary classification, but the parameters can also be adjusted depending on the dataset. This heuristic does not require any training and can achieve similar accuracy to some supervised machine learning algorithms. The heuristic is simple, intuitive, and computationally efficient.

Step 2: Endianness Optimization

Armed with the probabilities of bit gaps (i.e., the signal boundaries or cuts between adjacent bits of CAN messages or signals in the CAN data payload), an endianness optimization problem emerges. That is, the optimization problem is how to simultaneously determine the most likely packing of signals into the 64-bit data-field and most likely endiannesses of each of the eight bytes.

1) Valid Tokenizations

Denote a candidate signal I, as the list of bit indices ordered from MSB to LSB. Given a signal I, let LSB(I) (or simply LSB if no ambiguity is present) denote the least significant bit. Constant bits can be considered as 1-bit signals. Each CAN ID has eight bytes indexed j=0, . . . , 7 with byte j comprised of bits 8j, . . . , 8(j+1)–1. Let E(j)∈ {B, L} denote that byte j is big endian, little endian, respectively.

Definition 1 (Valid Tokenizations). For a given ID trace, define a valid tokenization, T, as a tuple of candidate signals $\{I_k\}_k$ and $\{E(j)\}_{j=0}^7$ such that:

(1) $\cup I_k = [0, \ldots, 63]$ (all 64 bits are used),
(2) $I_k \cap I_l = \emptyset$ for all k≠l (signals do not overlap),
(3) CAN only allows one type of endianness per byte, and is implicit in the notation E(j).

FIG. 5 illustrates a signal plot layout 506 depicting a valid, ground truth, tokenization of a CAN data field for one AID. Similar to FIG. 3A, each bit is depicted as a square with a solid border while different types of outlines are utilized to group bits for each signal. Constant bits 508 (bits 8-13, 27-28, and 56-63 are shown without an outline. The 10-bit little endian signal 510 starting at bit 0, is denoted I=(14, 15, 0, . . . , 7). Since, $B_{15} \to B_0$, necessarily the endianness of the two bytes involved are little endian (E(0)=E(1)=L).

This example shows that if a signal I crosses a byte boundary, the endianness of both bytes is determined by the order of the indices according Eq. 1 (i.e., either little endian or big endian). Accounting for this plays a role in the CAN-D configuration providing a computational tractable solution to the endianness optimization problem.

Definition 2 (Byte Boundaries). For j=0, . . . , 7 let v(j)∈ {$J_B$, $J_L$, C} denote if byte boundary j is:

a cut (C): bit 8(j+1)–1 ends a signal or is constant, a big endian join ($J_B$): 8(j+1)–1→8(j+1), or a little endian join ($J_L$): 8(j+1)–1→8(j–1) and V:={v∈ {$J_B$, $J_L$, C}$^8$ is a valid byte boundary set}.

For bits not on a byte boundary, i∉S:={8j–1}$_{j=0}^7$, there are only two options: cut or join ($B_i \to B_{i+1}$), and both are valid possibilities regardless of endianness.

Accordingly, a valid tokenization T has v satisfying:

| |
| --- |
| 1) v(j) = $J_B$ ⇒ E(j) = E(j + 1) = B |
| 2) v(j) = $J_L$ ⇒ E(j – 1) = E(j) = L |
| 3) v(0) ≠ $J_L$ |
| 4) v(7) ≠ $J_B$ |
| 5) v(j) = $J_B$ ⇒ v(j + 1) ≠ $J_L$, v(j + 2) ≠ $J_L$ |

(1) and (2) follow directly from the endianness definition (See Eq. 1) and the valid assumption of only one endianness per byte.

For (3) v(0)≠$J_L$ else 0→–8∉ [0, 63]. Similarly, for (4).

For (5), if v(j)=$J_B$ and either v(j+1)=$J_L$ or v(j+2)=$J_L$ then (1) and (2) imply E (j+1) is both big and little endian, a violation of one endianness per byte.

This can be summarized by {$J_B$, C}×{$J_B$, $J_L$, C}$^6$×{$J_L$, C} with no consecutive subsequences of the form ($J_B$, $J_L$) or ($J_B$, *, $J_L$)}

Definition 3 ($\mathcal{T}$ & $\mathcal{T}_v$)

Let $\mathcal{T}$ denote the set of valid tokenizations. For v∉ V let $\mathcal{T}_v \subset \mathcal{T}$ be the tokenizations with byte boundaries defined by v.

There are $|\mathcal{T}|=|V|\times|\mathcal{T}_v|=577\times 2^{64-8} \approx 4.16$ E19 valid tokenizations.

This is evidenced by the following: |{$J_B$, C}×{$J_B$, $J_L$, C}$^6$×{$J_L$, C}|=$2^2 \times 3^6$, and removing subsequences of the form ($J_B$, $J_L$) or ($J_B$, *, $J_L$) leaves 577 possibilities. $|\mathcal{T}_v|=2^{64-8}$, as the remaining 64-8 bit gaps have two valid options, cut or join.

2) Optimization Formulation

Step 1 provisions f(i|E($j_i$))=P (cut to the right of bit i for endianness E($j_i$), with $j_i$=[i/8] the corresponding byte index for bit i. By setting f (i,e)=∞ if bit i is to the left of a mandatory cut, e.g., the next bit is a constant bit. For the following, consider f(i|E($j_i$)) as a penalty for not cutting, and β as a fixed cut penalty parameter.

CAN-D endianness optimization implements a cost function. The idea for the cost function is to let signals accrue a join penalty, the sum of the probabilities f (i|E($j_i$)) for each bit that is not cut in order to form the signal. Since the candidate signal entails a cut to the right of its LSB, the term f (LSB, E($j_i$)) can be swapped for the cut penalty β. Thus, the cut penalty β controls how liberal the CAN-D system and method is configured to be with cuts.

CAN-D is configured to strike a balance between partitioning the CAN message into too many signals and joining multiple disparate signals. That is, a balance can be struck by balancing the cut penalty β with the likelihood of a cut (join penalty f). Setting β=1 will lead to only cutting where f (i|·)=∞ (signals demarcated by constant bits), and β=0 will lead to a cut at every gap, resulting in 64 1-bit signals.

Definition 4 (Costs)

The CAN-D Endianness Signal Cost can be defined as $$\phi(I, E) := \underbrace{\sum_{i \notin I\{LSB\}} f(i \mid E(j_i))}_{\text{join penalty}} + \underbrace{\beta}_{\text{cut penalty}}$$

In view of the above, the Signal Cost can be extended or reframed as a Tokenization Cost:

$$\Phi(T) := \sum_{I \notin T} \phi(I, E)$$
$$= \sum_{\substack{X_T(i)=0 \\ 63}} f(i \mid E(j_i)) + \sum_{X_T(i)=1} \beta$$
$$= \sum_{i=0} (1 - X_T(i))f(i \mid E(j_i)) + X_T(i)\beta$$

with $X_T(i)$=1 if i is an LSB of a token in T, else 0.

The above definition sets the endianness optimization problem, identify the optimal tokenization $T_0$.

$$T_0 := \arg \min_{T \in \mathcal{T}} \Phi(T). \quad (2)$$

A concrete example of using the cost function will now be described in detail. The two 8 by 8 bit arrays illustrated in FIG. 5 depict the big endian probabilities f(·|E=B) 502 and the little endian probabilities f(·|E=L) 504 respectively. These two visualizations represent potential input passed from a signal boundary classifier to an endianness optimizer in accordance with one embodiment of the present disclosure. That is, the input the endianness optimizer can be two 8×8 bit arrays with each bit representing the probability of a bit gap between a bit and its adjacent bit. The convention used in this example is that the bit value represents the probability of a bit gap between that bit and its neighbor to the right. As an example, the neighbor to the right convention means that the neighbor to the right of the LSB of the second byte (i.e., bit 15) is the MSB of the first byte (i.e., bit 0). A different convention, such as the neighbor to the left could be used instead. Two overlapping 11-bit candidate signals that both contain byte 4 (i.e., bits 32 to 39 numbered on the layout plot 506) can be evaluated by the CAN-D endianness optimizer:

a big endian signal $I_0$=[29, . . . , 31, 32, . . . , 39]

a little endian signal $I_1$=[32, . . . , 39, 24, . . . , 26].

The penalties for these candidate signals are $\phi_{\beta,f}(I_0, B)$=1.73−0.76+β=0.97+β, and $\phi_{\beta,f}(I_1, L)$=0+β=β, respectively. Since 0.97+β>β, then $(I_1, L)$ has a lower penalty, which means that the cost function predicts that the 11-bit candidate signal that contains byte 4 is little endian. In this case, this is true regardless of the choice of β. In fact, $(I_1, L)$ turns out to be in the globally optimal $T_0$, which is shown in the layout plot 506 of FIG. 5 as CAN signal 512.

3) Finding an Optimum: Given a cut penalty B∈ [0, 1] and pre-computed cut probabilities f (i|E($j_i$)) for all i∈ {0, . . . , 63} and both endiannesses E ($j_i$) (see Step 1)—an optimal tokenization can be selected from the 4.2E19 valid options.

Fixing v∈ V, where v gives cuts/joins at byte boundaries (bits in S={8(j+1)−1}$_{j=0}^{7}$), the subproblem:

$$\arg\min_{T \in \mathcal{T}} \Phi_{\beta,f}(T)$$

is realized by $T_{0,v}$, the tokenization: for all i∈ [0, 63]\S, bit i is an LSB (cut to the right of bit i) if and only if β<(f (i|E($J_i$)).

This is evidenced where $T_{0,v}$ is as above and T∈ $\mathcal{T}_v$. By definition, for i∉ S, T will accrue cost min, (f(i|E($j_i$)), β. Since T, $T_{0,v}$∈ $\mathcal{T}_v$ both accrue the same cost for bits i∈ S. It follows that $\Phi(T)-\Phi(T_{0,v})=\Sigma_{i \notin S}$ [(1−$X_T$(i)) f(i|E($j_i$))+$X_T$(i)β−min (f(i|E($j_i$)), β)]≥0.

This exemplary embodiment provides an efficient, constant-time search algorithm (689 operations), namely, (1) storing in memory the optimal cut/join choice for each bit i∈ [0, 63]\S under each endianness (56×2 operations), then (2) applying above to realize both $T_{0,v}$ and cost $\Phi(T_{0,v})$ for each of 577 v∈ V and maintaining the minimum. In the case that there are multiple optimal tokenizations, ties can be broken in essentially any suitable way or ways. For example, in the current embodiment, the CAN-D endianness classification is configured to break ties by choosing the tokenization with the maximum number of cuts, followed by the minimum number of little endian signals, which provides a unique solution according to one set of criteria. It should be understood that optimal classification may be different under a different set of criteria and that the present disclosure is not limited to the particular criteria utilized to arrive at an optimal tokenization as described above.

Tuning parameter β, can be tuned to essentially any value to provide different CAN-D tokenizations. In practice, setting the tuning parameter between 0.5-0.7 yielded fairly consistent and correct tokenizations, though the tuning parameter need not be limited to those values. In some embodiments, a tuning parameter of. 6 is preferred. It is worth noting that if the heuristic classifiers of Step 1 are used, they provide probabilities in {0,1} meaning all choices of β yield identical results. Further, with binary inputs, a tiebreaker scheme is often necessary, whereas with high precision probability inputs, multiple optimal tokenizations with the same cost are virtually impossible.

The outputs of the endianness optimizer described in this step are tokenized signals, which can be referred to as signals or tokens. CAN-D systems and methods generally include this or a variant of the endianness optimizer described herein.

C. Step 3: Signedness Classification

The CAN-D signedness classifier takes a tokenized signal (e.g., a signal defined by start bit, length, and endianness) and makes a binary decision about signedness (e.g., whether each signal of length greater than two is signed (using two's complement encoding) or unsigned).

The classifier can be implemented as a heuristic or machine learning algorithm. For example, supervised machine learning algorithm or a heuristic can be utilized to determine signedness. Since each signal is tokenized, and thus the LSBs and MSBs are defined, features can be developed per signal rather than per bit.

In one embodiment, CAN-D implements a heuristic based on the distribution of the two most significant bits of the signal. One example of such a heuristic is presented as Algorithm 2 below. This heuristic can obtain almost perfect classification (97:3% F-Score). In alternative embodiments, a classifier based on a learned model or another algorithm can be implemented in the CAN-D pipeline instead.

The CAN-D signedness heuristic is based on how the two most significant bits behave if the signal is signed or unsigned. The MSB and next-most significant bit of a signal I can be represented by $B_{i_0}$, $B_{i_1}$.

First, consider the probabilities of the center values, $P[(B_{i_0},B_{i_1})=(1,0)]$, $P[(B_{i_0}, B_{i_1})=(0,1)]$. If a signal is signed, for values close to zero ($B_{i_0}$, $B_{i_1}$) will be (0, 0) (small positives) or (1, 1) (small negatives), whereas values near extremes will be (1, 0) (near min) or (0, 1) (near max). A signal with a small probability of these values is therefore likely signed. Second, consider the probability of a jump between extreme values, $P[(B_{i_0}(t_j),B_{i_1}(t_j)=(0,0) \wedge (B_{i_0}(t_{j+1}),B_{i_1}(t_{j+1}))=(1, 1)]$. If a signal is signed, when changing from small positive to small negative values, the two MSBs must flip from (0, 0) to (1, 1). However, if it is unsigned, this is unlikely to ever happen since this would entail flipping from a very small value to a large one resulting in a significant discontinuity. If this probability is 0, the signal is likely unsigned. These two logical conclusions form the basis for the CAN-D heuristic signedness classifier described in Algorithm 2. The heuristic parameter gamma γ can be set based on observations of data. For example, in the current embodiment of the CAN-D system and method, the CAN-D heuristic signedness classifier has the tuning parameter gamma γ set to 02.

---

Algorithm 2: Heuristic Signedness Classifier

---

Inputs: $\{B_{i_0}(t), B_{i_1}(t)\}_t$, γ
if $P[(B_{i_0}, B_{i_1}) = (1,0)] + P[(B_{i_0}, B_{i_1}) = (0, 1)] = 0$ then
| return TRUE
if $P[(B_{i_0}(t_j), B_{i_1}(t_j)) = (0, 0)^\wedge$
  $(B_{i_0}(t_{j+1}), B_{i_1}(t_{j+1}) = (1,1)] = 0$ then
| return FALSE
if $P[(B_{i_0}, B_{i_1}) = (1, 0)] + P[(B_{i_0}, B_{i_1}) = (0, 1)] < \gamma$ then
  return True
return False Accordingly, the CAN-D heuristic signedness classifier of Algorithm 2 evaluates whether a signal is signed or unsigned, returning true if the heuristic signedness classifier predicts the signal is signed and returning false if not.

After step 3, signedness classification, each CAN ID's 64-bit message is partitioned into signals. For each signal, the CAN-D system and method can predict the start bits, lengths, endianness, and signedness for each signal in the 64 bit message. Consequently, each signal can be translated into a timeseries of integers, denoted s(t).

D. Step 4: Physical Interpretation

The CAN-D physical interpretation 108 includes a signal-to-timeseries matcher 130. A number of different matchers are known. In the current embodiment of the CAN-D system and method, a portion of the methodology from the Verma Automotive CAN Tokenization & Translation (ACTT) (which was previously incorporated by reference in its entirety) is implemented in CAN-D. In particular, CAN-D adapts and integrates Verma ACTT's methodology for matching a subset of the translated signals with diagnostic data. This augments matched signals with information, allowing for them to be interpreted as actual vehicle measurements.

In general, the physical interpretation algorithm (a sub-process of CAN-D) operates by comparing each signal time series, s(t) to each DID trace D(t') and making a determination as to whether they are linearly related. Because DID traces are generally sampled at a lower rate than normal CAN traffic, interpolation is utilized to estimate the signal values over the diagnostic timepoints, obtaining s(t'). The algorithm includes a regression function that regresses D(t') onto s(t') and finds the best linear fit, furnishing the coefficients a, b so that $\bar{s}(t)$: =as(t')+b≈D(t'). To score the model's fit, the matcher 130 uses a coefficient of determination, $R^2$. The coefficient of determination measures the fraction of total variation in time series D(t') that is explained by $\bar{s}(t')$; thus, $R^2=1$ exhibits a perfect fit, while $R^2=0$ exhibits the fit of a horizontal line (assuming D(t') is not the horizontal line). For each signal s, the matcher function 130 is configured to find the diagnostic D that matches with the highest $R^2$ value. A tuning parameter delta $\delta$ allows the physical interpretation signal-to-timeseries matcher to be tuned. If $R^2 > \delta$ where $\delta \in [0, 1]$ is a tuning threshold, s is matched to D. Setting $\delta=1$ will return only perfectly correlated signals, while setting $\delta$ to be small will allow for signals with a lower score to be matched. In the current embodiment and implementation of CAN-D, the tuning parameter delta $\delta$ is set to 0.5.

Signals that match a diagnostic according to the matcher 130 can be properly interpreted. That is, by matching the translated signals with the external labeled timeseries, the translated signals can be identified/labeled appropriately and have proper units associated with the value of the translated signal accounting for any scaling and offset with a scale parameter a and offset parameter b.

Other signal-to-time-series matchers, e.g., such as Libre-CAN, could be used interchangeably (or combined) with the CAN-D matcher component. See Pesè, M. D. et al. (2019) LibreCAN: Automated CAN Message Translator. In SIGSAC CCS ACM, which is hereby incorporated by reference in its entirety.

Further, translated signals that are not augmented with labels by the physical interpretation step may still be valuable, as there are many applications in which unlabeled translated timeseries are as or more useful than binary data.

CAN-D Hardware

CAN-D may be implemented utilizing a variety of different computing systems. These computing systems are now increasingly taking a wide variety of forms. Computing systems may, for example, be mobile phones, laptop computers, tablet computers, embedded systems, and the like. A "computing system" is intended to include any device, system, or combination thereof that includes at least one processor, and a physical and tangible computer-readable memory, capable of having thereon computer-executable instructions that are executable by the processor. A computing system may be distributed over a network environment and may include, multiple, constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

The various algorithms and processes of a computing system can include executable modules or executable components that can refer to software objects, routines, methods, or similar computer-executable instructions that may be executed on the computing system. For example, CAN-D can be implemented on a computing system with separate executable modules or executable components that makeup the different modular components of the CAN-D pipeline. Alternatively, the entire CAN-D pipeline may be implemented as a single executable component Or module, or in some other number of components or modules. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both. For example, the CAN-D application can communicate over the OBD-II port of a vehicle.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g., character, double, floating-point), composite types (e.g., array, record, union, etc.), abstract data types (e.g., container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or source code.)

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services), The definition of "cloud computing" is not limited to any of the other numerous advantages that can be obtained from such a model when property deployed.

Preprocessing

Figure 9:
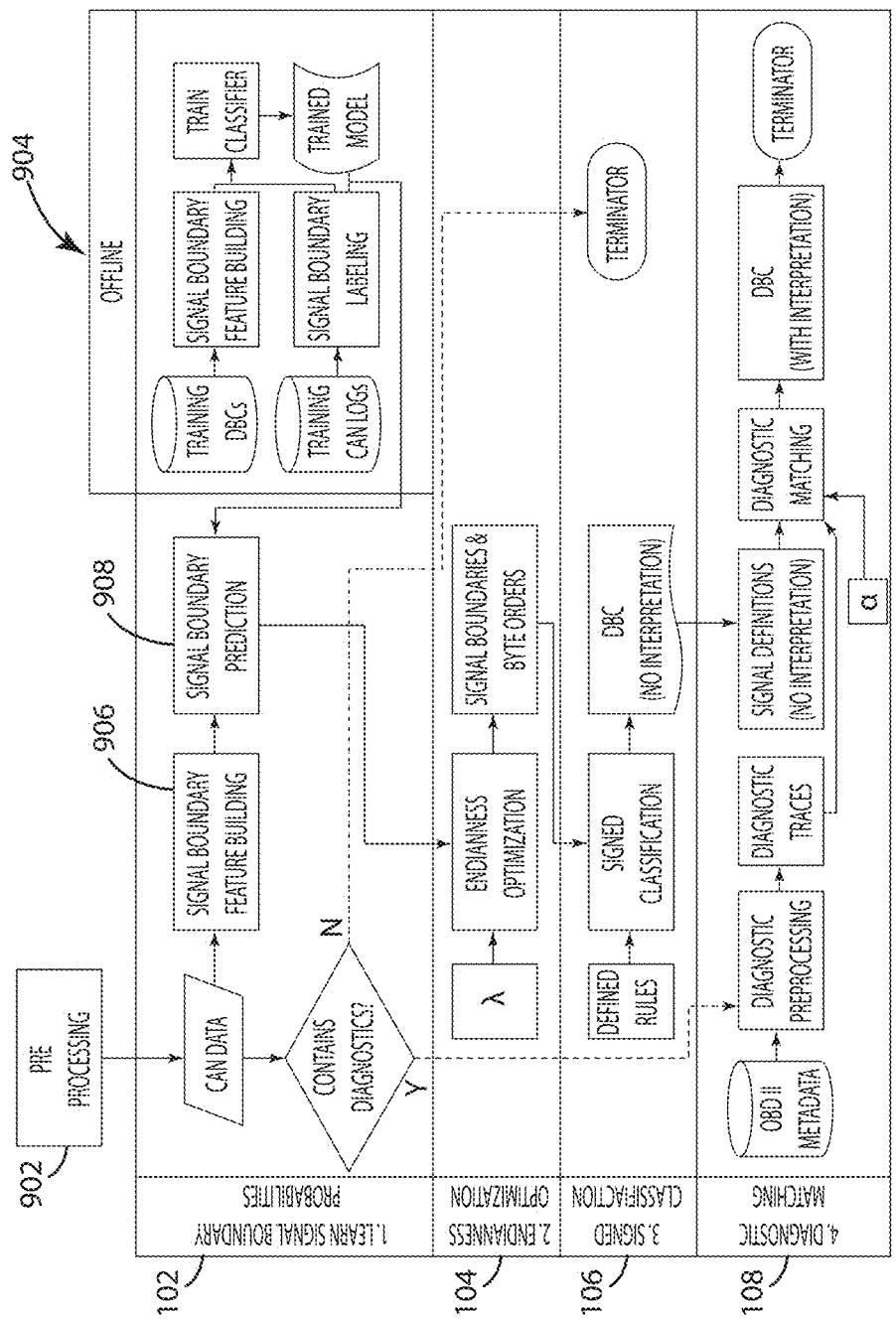
FIG. 9 illustrates an alternative embodiment of a CAN-Decoder Pipeline.

Some steps may be appropriate, such as preprocessing, prior to operating the CAN-D pipeline in some embodiments. For example, CAN log data may be collected prior to operation of the pipeline (while in other embodiments the pipeline can be operated in real time with collection of CAN data for reverse engineering the signal definition s). FIG. 9 illustrates an embodiment of the CAN-D pipeline that includes some preprocessing steps 902, 904. For example, received CAN data can be preprocessed 902 from a CAN log or a stream of real-time CAN data, a CAN data database, or some other source of CAN data and formatted into a suitable form for use in the CAN-D pipeline to decode CAN signal definitions. The CAN-D pipeline can also include some processing of the CAN data (e.g., signal boundary feature building 906) to prepare the data for the signal boundary prediction 908. As another example, if any supervised machine learning algorithms are being utilized in the CAN-D pipeline, they can be trained in a preprocessing training step 904. In the depicted embodiment of FIG. 9, a supervised machine learning algorithm is utilized for the signal boundary prediction. The training 904 includes obtaining training DBCs and training CAN data that can be utilized to build signal boundary features and signal boundary labels, which can be utilized to train the signal boundary machine learning algorithm (i.e., classifier) into a trained model that can be deployed in the CAN-D system. A similar approach can be utilized for any other machine learning modules, e.g., if the signedness classification is configured as a supervised machine learning algorithm.

Preprocessing steps may be performed offline or remote to the CAN-D operation. For example, processing 902 or training 904 can be done essentially any time prior to executing the CAN-D pipeline. The results of either preprocessing step can be saved in memory in the CAN-D apparatus for use during execution of the process.

Figure 10:
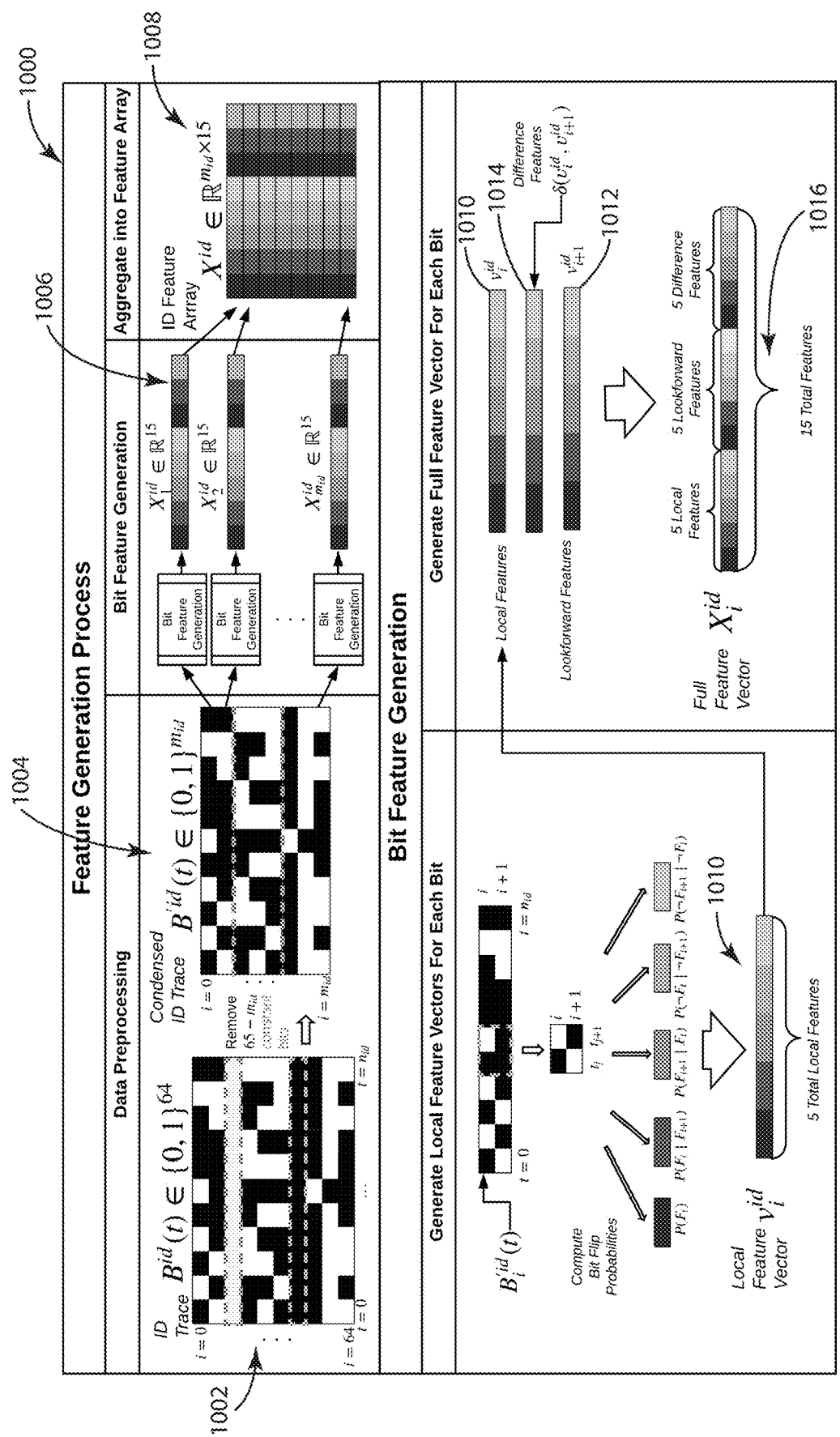
FIG. 10 illustrates a feature generation process.

FIG. 10 depicts an exemplary preprocessing feature generation and bit feature generation processes that can be utilized to train a signal boundary classifier. In particular, FIG. 10 illustrates an exemplary feature generation process 1000 for an AID trace 1002 and for each gap. To build features from an AID trace, the constant bits are removed resulting in a condensed AID trace 1004, which can be denoted $B^{id}(t) \in \{0, 1\}$ $m_{id}$ where $m_{id}$ refers to the number of non-constant bits for a given arbitration ID. For each remaining $m_{id}$. A set of features 1006 can be generated from the condensed AID trace 1004 and aggregated into an ID feature array 1008.

Local features vectors for each bit can also be generated. A set of 5 exemplary local features 1010 are denoted $v_i^{id}$. The local feature generation of the current embodiment includes generation of fie bit flip probabilities. The LSBs generally flip much more often than an adjacent signal's MSB; hence, the bit flip features provide good indicators for boundaries. In alternative embodiments, different local features can be generated.

Forward and/or backward neighboring bits can be analyzed and the same feature computed for bits i+1 or i−1. For example, five look forward features 1012 can be computed for i+1. In addition, difference features 1014 can also be evaluated. The local 1010, look forward 1012, and difference 1014 features can be combined into a full feature vector 1016.

Dataset

CAN-D aims to provide vehicle-agnostic CAN data signal extraction capability. CAN-D can be trained and evaluated based on data collected from a variety of different vehicle makes and years ranging from 2010 to 2017. Table IV lists details of defined signals for CAN logs from an exemplary training dataset.

TABLE IV

| Log | IDs[1] | Def. IDs | Unsigned, B.E. | Signed | L.E. | Total |
|---|---|---|---|---|---|---|
| #1[2] | 54 | 17 | 61 | 3 | 25 | 89 |
| #2 | 66 | 14 | 143 | 21 | 0 | 164 |
| #3 | 35 | 7 | 50 | 18 | 0 | 68 |
| #4 | 79 | 28 | 181 | 0 | 0 | 181 |
| #5 | 63 | 21 | 111 | 5 | 0 | 116 |
| #6 | 22 | 19 | 72 | 2 | 14 | 87 |
| #7 | 26 | 8 | 53 | 3 | 0 | 56 |
| #8 | 40 | 8 | 98 | 10 | 1 | 108 |
| #9 | 27 | 17 | 56 | 7 | 18 | 75 |
| #10 | 55 | 14 | 136 | 21 | 0 | 157 |

[1]Non-constant IDs: IDs with more than one non-constant bit
[2]Vehicle adheres to J1939 Standard protocol [35], and signal definitions are derived from this open standard.

A training dataset, such as that described in Table IV can be utilized to test generalizability of the methods.

In short, the training dataset includes statistics on ten CAN logs, each collected from a vehicle of a different make. This training dataset does not include any duplicate makes because different models of the same make (e.g., Toyota Camry and Corolla) typically have similar characteristics. However, alternative training datasets need not be constructed in this fashion. For each log, the CAN-D training system enumerates non-constant IDs (IDs), non-constant IDs defined by CommaAI (Def. IDs), and each of the encodings of defined signals (big/little endian, signed/unsigned) resulting from a ground-truth labeling process. In this exemplary training set, three logs contain a high percentage of little endian signals, and all but one contain signed signals.

Training dataset(s) for training CAN-D to configure the CAN signal reverse engineering process (accounting for bit position, endianness, and signedness), can be obtained from DBC files or other sources. Some CAN logs can be obtained from vehicles that use the J1939 standard, a protocol for heavy trucks that provides signal definitions that are publicly available. Accordingly, datasets obtained in this way provide absolute ground-truth labels for the signals in these logs. Further, J1939 logs contain every type of signal (little endian, big endian, signed, unsigned), and thus provide a comprehensive set for the CAN-D system to be confidently trained and evaluated on.

Additional logs can be generated or obtained in other ways. For example, logs can be obtained utilizing CommaAI's OpenDBC project. See Comma AI: Open DBC available at https://github.com/commaai/opendbc. This is an open, crowdsourced set of DBCs constructed by individuals using a CommaAI Panda device (an OBD-II plugin) along with the CommaAI Cabana interface to hand label data for their vehicle through trial, error, and visual inspection. OpenDBC only includes DBCs for a limited number of vehicles and only a subset of IDs/signals for vehicle are defined. In particular, unobservable signals are often missing since they cannot be determined by visual inspection.

The exemplary training dataset of Table IV includes CAN data collected data from vehicles that had a closely matching CommaAI DBC (i.e., same manufacturer, similar model/year/trim). Due to the crowd-sourced nature of the data, the data may contain mislabeled signals.

The CAN-D training process can include a quality control process. For example, the quality control process can include partitioning each non-constant ID trace into sequences of contiguous, non-constant bits and labeling each as an unsigned, big endian signal. This provides a set of baseline signal definitions. Next, the training process can include parsing the data according to the DBC, trimming off any signal MSBs that are constant, likely due to extreme values not being reached and redefine the signal to have the trimmed start bit and length. For IDs defined by CommaAI, the baseline and trimmed CommaAI signal definitions can be compared. If the definitions for the ID agree (and optionally also pass a visual check), the CAN-D training system can automatically add them to the ground-truth DBC. If they disagree, they can be disregarded or further investigated. To give an example of visual inspection, the signal tokenization layout and signal time series' plots can be displayed side by side in a CAN-D training interface for the user to identify the discrepancies. FIGS. 6A-C illustrate a representation of such an exemplary CAN-D training interface with these types of visualizations. If easily resolvable by experimentation and visual inspection (e.g., adding an obvious signal definition missing from CommaAI DBC, identifying an unsigned signal mislabeled as signed, etc.), the correct signal definitions can be added to the CAN-D training DBC with the minor errors fixed. If the discrepancy cannot be resolved easily, CAN-D can ignore that ID or signal and not create a corresponding entry in the CAN-D ground-truth DBC used for training. For IDs that do not appear in the CommaAI DBC or other training dataset source, a similar process of visual inspection of the baseline plots can be conducted, adding any easily resolvable definitions to the CAN-D ground-truth, and discarding them if not.

This visual inspection method is quite effective due to the fact that legitimate signals and misclassified encodings (e.g., signed signals translated incorrectly as unsigned) are recognizable from the time series plots.

Evaluation

Using a CAN-D training dataset the overall CAN-D process and its individual modular components can be effectively evaluated. For example, the signal boundary classification methods can be quantitatively compared by comparing the number of correctly and incorrectly labeled bits. As another example, the full tokenization and translation efforts of CAN-D can be evaluated by computing the $\ell^1$ error between the translated signals and their corresponding ground-truth signals. This evaluation can be useful because it shows how effective CAN-D is at extracting time series that can be used as actual real-time measurements from systems in the vehicle.

FIGS. 6A-C provide three examples of messages decoded by CAN-D. These examples illustrate message layout plots with signed and unsigned signals, little endian unsigned signals and little endian (signed and unsigned) signals. CAN-D correctly tokenizes and translates the examples and overall furnishes interpretable timeseries. Where available, CAN-D's physical interpretation is provided in annotations above signals, showing $R^2$ value to gauge goodness-of-match. Overall, mis-tokenization and mistranslation by other methods result in rampant discontinuities and dramatic error in most timeseries, exhibiting the advantage of correctly identifying each signal's endianness and signedness.

OBD-II Plugin

Figure 7:
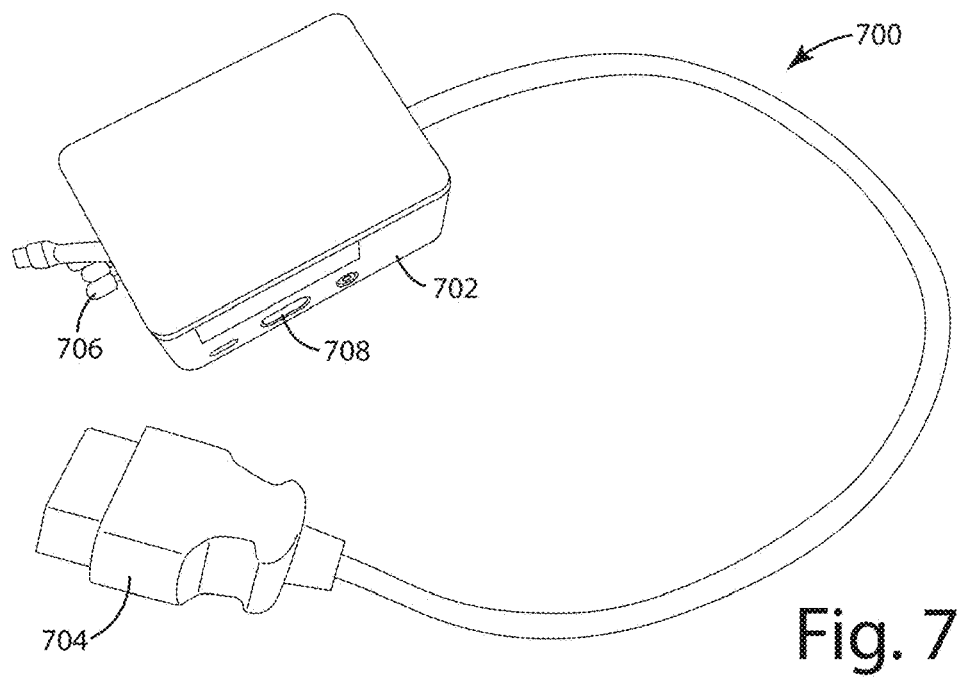
FIG. 7 illustrates one embodiment of a CAN-D apparatus configured to decode vehicle CAN data.

FIG. 7 illustrates a CAN-D device implemented utilizing a Raspberry Pi and CANBerry Dual 2.1 boards. The CAN-D device 700 includes a housing 702, processor, memory, power input and CAN interface 704. The CAN-D processor is configured to provide a vehicle agnostic, OBD-II (on-board_diagnostic) plugin that collects CAN data from the vehicle OBD-II port to which the CAN-D device is installed. Further, the current embodiment of the CAN-D device is configured to operate the CAN-D pipeline (depicted in FIG. 1) either on a single-board computer (depicted in FIG. 7) or on a standard computer.

The CAN-D device includes a Linux-based, single-board computer. Specifically, the CAN-D device includes a Raspberry Pi 3B+ with Raspbian Buster in conjunction with an Industrial Berry's CANBerry Dual 2.1. The Raspberry Pi 3B+ provides 1 GB of RAM and a 1.4 GHz ARMv8 processor. The device can be powered either from battery or using on-board power from a vehicle's 12-volt system.

One challenge of building a vehicle-agnostic CAN-D device is that the bitrate for the CAN is generally unknown and variable per vehicle, and improper bitrate selection can cause adverse functionality. In order to address this issue, the CAN-D device is configured to iterate through common bitrates, identifying the bitrate that results in only expected packets. This renders the CAN-D device compatible with most CANs regardless of bitrate. Another complication is that automobiles typically have multiple CAN buses, and often more than one is accessible from the OBD-II interface. The CAN-D device can analyze two or more unique networks by allocating a dedicated CAN controller for each using CANBerry Dual 2.1.

Once in communication with the vehicle CAN (e.g., via the OBD-II port or otherwise), the CAN-D device can automatically determine each network bitrate, identify the VIN (e.g., by using the unified diagnostic services (UDS) query-response protocol), and begin logging CAN data. The CAN-D device can include a physical or software switch that can be flipped to augment the network traffic with available diagnostic queries. The CAN traffic can be collected by the CAN-D device, for example using SocketCAN can-utils (See CAN Utils. http://github.com/linux-can/can-utils). The CAN traffic can be logged in local memory located on the CAN-D device or remote memory located on the Internet (e.g., using a wireless cellular Internet connection or other type of Internet connection). Further, the CAN traffic can be stored to an ASCII-encoded text CAN log file or other format. The file can be named or include identifying information such as timestamp and vehicle identification number (VIN), which can be automatically identified via a diagnostic query. The CAN-D device can include light emitting diodes (LEDs) 706 or other types of indicators that can be flashed or activated to indicate status and/or progress throughout CAN-D collection/training and/or the CAN-D normal operation of real-time tokenization and translation. The CAN-D device can run the CAN data captured or logged through the CAN-D pipeline, outputting a DBC file (or other signal definition file) which can be used for real-time decoding and/or visualization of signals, either on a GUI provided on the device or via communication to a vehicle display on the CAN or a remote device, such as a smartphone or computer via a display out port 708, such as an HDMI port.

The heuristic signal boundary classifier (Step 1) can be utilized to benchmark the device running the CAN-D pipeline. For example, one benchmark was run on collected CAN traffic augmented with diagnostic data from a passenger vehicle for 70 seconds, logging 170,000 frames. Running the CAN-D pipeline on this logged CAN traffic averaged about 129 seconds: 55 s for preprocessing, 14 s for tokenization & translation (Steps 1-3), 50 s for interpretation (Step 4), and 10 s for writing the output to the DBC, over about 6 runs with negligible variance. Alternative embodiments may have increased efficiency. Accordingly, the CAN-D pipeline can be implemented in a portable, lightweight, edge computing device.

CAN-D provides a vehicle-agnostic system and method for extracting the hidden signals in automotive CAN data. The current embodiment of CAN-D is a four-step, modular, pipeline that implements a combination of machine learning, optimization processes, and heuristics, to identify and correctly translate signals in CAN data to their numerical timeseries. In particular, CAN-D can extract big and little endian signals as well as signed and unsigned signals. While accounting for endianness and signedness increases complexity, CAN-D can decode a larger range of CAN signal definitions. When endianness and signedness are ignored, the resulting translations are incorrect and overly noisy. CAN-D achieves less error (in some embodiments up to less than 20% of the average error of other CAN decoding methods) and can handle any standard CAN signal.

CAN-D can be incorporated into a lightweight hardware implementation. It can be implemented in-situ via an OBD-II connection to learn a vehicle's CAN signals, and in future drives convert raw CAN data to multivariate timeseries in real time. CAN signals provide a rich source of real-time data that is currently unrealized, the decoding functionality of CAN-D will facilitate vehicle technology developments.

Figure 8:
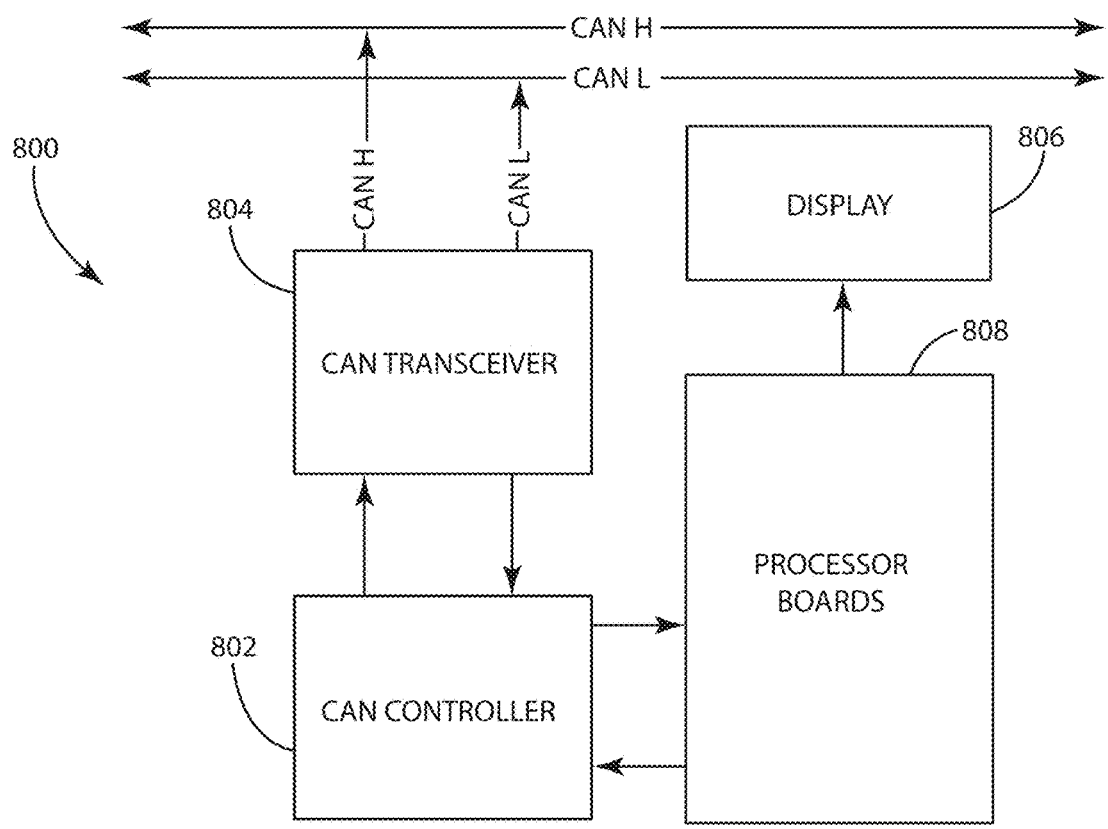
FIG. 8 illustrates one embodiment of a functional block diagram of the CAN-D apparatus of FIG. 7.

FIG. 8 illustrates a representative block diagram of an alternative embodiment of the CAN-D apparatus of FIG. 7. The CAN-D apparatus 800 of FIG. 8 includes a CAN Controller 802, CAN transceiver 804 for transmitting and receiving CAN signals, one or more processor board(s) 808, and a display 806. The CAN-D apparatus of FIG. 8 can be an all-in-one device like that of FIG. 7, or alternatively the CAN-D device can have functionality separated into multiple devices. For example, the display and a processor board may be housed in a separate graphing and visualization tool connected by way of an HDMI or other cable to a CAN extraction device that includes the CAN transceiver, CAN controller, and a processor board. The CAN-D apparatus 800 can communicate with multiple vehicle CANs, such as CAN H and CAN L.

Operation

Exemplary operation of the CAN data collection and signal definition reverse engineering mode of the CAN-D apparatus will now be described in detail. First, the CAN-D apparatus is plugged into the OBD port of the vehicle so that the vehicle can power the device. The device comes on and a flashing green light indicates it is determining the pre-configured CAN bit rate, i.e., the speed of communication for that CAN. After the CAN bit rate has been determined, the indicators flash red and green indicating request of a vehicle identification number. Once the VIN is received, the indicator turns solid green and begins collection of raw data from the CAN. At this time, the operator can continue to operate the vehicle, which will result in various different CAN frames being sent and therefore collected by the CAN-D apparatus.

The CAN-D apparatus includes a button, which when pressed changes the indicator to a flashing blue light, which indicates the CAN-D apparatus is now augmenting the ambient raw CAN data being collected with diagnostic queries from the on-board diagnostic service. In essence, the CAN-D apparatus is cataloging and determining the responses of these diagnostic queries that the vehicle will reply to. The queries can be sent on a fast loop such that the CAN-D apparatus receives a lot of sensor information such as wheel speed, coolant temperature, engine speed, etc. By augmenting the raw CAN data collected by the CAN-D apparatus with the diagnostic responses, it does not take long for the CAN-D apparatus to collect sufficient data for useful analytics. That is, a great volume of CAN data can be collected in just a few minutes—though much more can be collected and utilized in analytics.

The CAN-D apparatus or a device in communication with the CAN-D apparatus can be configured as a CAN signal extraction and graphing tool. While plugged into the OBD port of a vehicle the CAN-D apparatus can read the raw CAN messages that are being communicated throughout the vehicle between ECUs. For this example, the CAN-D apparatus has already run the CAN-D pipeline to generate a CAN database DBC file and to extract some signals from the vehicle.

The collected CAN data can be automatically or semi-automatically processed in order to reverse engineer CAN signal definitions as discussed above in detail, which, in turn, can then be utilized by the CAN-D apparatus to decode received CAN signals in real time. The decoded CAN data signals can be provided to the user via a user interface on the CAN-D apparatus or a user interface on a device that the CAN-D interface is in communication with. Alternatively, the CAN-D reverse engineered signal definitions can be provided to a separate device for real-time decoding of CAN signals. Further, alternatively or in addition CAN signals can be decoded in real time by the CAN-D apparatus and communicated to another device, such as a cloud server, smart phone, or laptop.

A graphing tool can be used in order to visualize and understand some of the CAN signals from the vehicle. The graphing tool can enumerate the available arbitration IDs within the vehicle that the CAN-D apparatus was able to tokenize and also provides the translation, if available, for the signals. Even where no physical interpretation is available, the graphing tool can still provide visualization of signals by graphing the un-interpreted time series. As an example, one AID may contain engine rpm and coolant among others in an electric hybrid car. Accordingly, no RPM signal may be associated with the combustion engine at certain times, such as while idling. However, by popping the hood latch in some electric hybrid cars the combustion engine is forced awake resulting in about 1600 RPMs, which can be seen graphically in real-time on the graphing tool interface. As another example, combustion engine coolant temperature can be dynamically read from raw data on the CAN without use of diagnostic queries or diagnostic values. Finally, unknown signals (i.e., signals without physical interpretation) can be graphed in an effort to help determine what they refer to.

The dichotomy between the two modes of operation (i.e., step 1: one time training; and step 2: real-time decoding) is perhaps best illustrated in the representative diagram of FIG. 11. FIG. 11 illustrates that the CAN-D apparatus 1102 is in communication with the vehicle CAN 1104 and receives CAN data 1105 during a one-time training session (though multiple training sessions or retraining can be done), which is fed into the CAN-D pipeline 1106 to reverse engineer signal definitions 1108. That is, essentially CAN log data can be utilized to train the CAN-D apparatus to decode CAN frames by arbitration ID. Once the signals are mapped for the desired arbitration IDs that the user wishes to encode, the CAN-D can be switched into real-time decoding mode where instead of the CAN data being fed into the CAN-D pipeline to reverse engineer the signal definition for that CAN ID, the stored signal definitions 1108 (e.g., stored in a DBC file) can be utilized to tokenize and translate fresh CAN data 1110 provide the translated signals 1112 to the user. The mode switching may be done automatically by way of a logic check on collected CAN frames. That is, the arbitration ID of collected CAN data can be referenced against the DBC file and decoded if the AID is present. If it is not present, the CAN data frame can be analyzed by the CAN-D pipeline for signal definition reverse engineering.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A data-driven, vehicle-agnostic method for reverse engineering controller-area network (CAN) message definitions, the method comprising:
   receiving a plurality of CAN packets from a CAN of a vehicle, each CAN packet comprising a message, the CAN message packing signals encoded based on unknown definitions established by third parties, each signal definition including information on how to tokenize, translate, and interpret the signal, where the information to tokenize is configured to demarcate a sequence of bits corresponding to the signal and includes start bit, bit-sequence length, and byte ordering, where the information to translate is configured to convert the sequence of bits to integers by indicating whether unsigned or signed binary-to-integer encoding was used to encode the sequence of bits, and
   where the information to interpret comprises label and unit giving physical meaning of the signal and its units, and a scale and offset providing a linear mapping of the signal to its units;
   for each CAN packet of the received plurality of CAN packets, partitioning the message into signals having defined but unknown start bits, lengths, byte order, and signed or unsigned encoding to obtain a respective time series of integers for each of the signals, wherein partitioning the message into signals comprises learning signal boundary probabilities by at least one of an unsupervised signal boundary classification algorithm and a supervised signal boundary classification algorithm, then optimizing, based on the signal boundary probabilities, the signal packing likelihood within the message to tokenize signals by identifying the byte orderings within the tokenized signals, and
   classifying each tokenized signal as signed or unsigned by at least one of a supervised learning method or an unsupervised learning method;
   converting each tokenized signal to a time series of integers based on signedness classification;
   receiving time series of diagnostic responses corresponding to physical measurements in the vehicle; and
   interpreting at least some of the time series of integers as corresponding physical measurements by comparing each time series of integers to a plurality of time series of labeled data to match the time series of integers to a corresponding one of the time series of labeled data.

2. The method of claim 1, wherein the plurality of time series of labeled data includes one or more of timestamped diagnostic responses, timestamped GPS data, timestamped yaw, pitch, and roll data from an accelerometer disposed in the vehicle, and timestamped yaw, pitch, and roll data from an inertial measurement unit disposed in the vehicle.

3. The method of claim 1, wherein the plurality of time series of labeled data includes a plurality of time series of diagnostic responses and wherein the comparing includes determining a linear mapping between the time series of integers and a particular time series of diagnostic response.

4. The method of claim 1, wherein the physical measurements in the vehicle comprise measurements available via Unified Diagnostic Standard.

5. An apparatus for real-time interpretation of vehicle controller area network (CAN) data, the apparatus comprising:
- a vehicle CAN interface configured to receive vehicle CAN frames, each vehicle CAN frame having an identifier (ID) and CAN data, wherein the CAN data is encoded based on an unknown signal definition established by a third party, each unknown signal definition including information to tokenize, translate, and interpret the CAN data, where the information to tokenize includes information to demarcate sequences of bits corresponding to signals in the CAN data and byte ordering, wherein the information to translate includes information about how the sequences of bits were converted to integers;
- memory configured to store an ID trace including CAN data from different vehicle CAN frames associated with a particular vehicle CAN frame ID;
- a processor configured to generate a vehicle CAN signal definition for CAN data associated with the particular vehicle CAN frame ID based on the ID trace, wherein the processor is configured to predict signal boundaries within the CAN data based on the CAN data in the ID trace and generate signal boundary probabilities, wherein the processor is configured to predict endianness of signals within the CAN data based on the signal boundary probabilities and generate tokenized signals, wherein the processor is configured to predict signedness of the tokenized signals and generate translated signals, wherein the processor is configured to match the translated signals to external labeled timeseries and generate interpreted signals, wherein the processor is configured to generate the vehicle CAN signal definition based on the interpreted signals and store the generated signal definition in memory; and
- wherein the processor is configured to decode CAN data in CAN data frames with the particular vehicle CAN frame ID received by the vehicle CAN interface according to the signal definition stored in memory.

6. The apparatus of claim 5, wherein the CAN data includes up to 64 bits of data.

7. The apparatus of claim 5, wherein the signal boundary probabilities include bit-wise probabilities of bit gaps between consecutive bits in the CAN data.

8. The apparatus of claim 5, wherein the signal boundary probabilities include a first set of signal boundary probabilities that assume big endian byte ordering and a second set of signal boundary probabilities that assume little endian byte ordering, wherein the processor is configured to predict endianness of signals within the CAN data using an optimization algorithm based on the first set of signal boundary probabilities and the second set of signal boundary probabilities.

9. The apparatus of claim 5, wherein the processor is configured to predict the likelihood of signal boundaries within the CAN data as a function of bits local to CAN data bit gaps.

10. The apparatus of claim 9 wherein the processor is configured to predict the likelihood of signal boundaries within the CAN data utilizing a heuristic.

11. The apparatus of claim 5, wherein the processor is configured to generate signal boundary probabilities based on a trained supervised machine learning signal boundary model.

12. The apparatus of claim 9, wherein the processor is configured to predict endianness of signals within the CAN data based on signal boundary probabilities generated as a function of bits local to CAN data bit gaps and a plurality of different assumed endianness es.

13. The apparatus of claim 5, wherein the processor is configured to predict endianness of signals within the CAN data based on a cost function that balances partitioning CAN data into too many signals and joining multiple disparate signals.

14. The apparatus of claim 13, wherein the balance is struck by balancing a cut penalty $\beta$ with a join penalty f.

15. The apparatus of claim 5, wherein the processor is configured to predict signedness of the tokenized signals and generate translated signals with a CAN-D signedness heuristic.

16. The apparatus of claim 15, wherein the CAN-D signedness heuristic is based on how the two most significant bits of a signal behave when the signal is signed and unsigned.

* * * * *